United States Patent
Kazmi et al.

(10) Patent No.: US 9,973,956 B2
(45) Date of Patent: May 15, 2018

(54) METHOD AND APPARATUS FOR MEASUREMENT PROCEDURES WITH COMPOSITE DYNAMIC SUBFRAMES IN DYNAMIC TDD

(71) Applicant: Telefonaktiebolaget L M Ericsson (publ), Stockholm (SE)

(72) Inventors: Muhammad Kazmi, Bromma (SE); Imadur Rahman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 742 days.

(21) Appl. No.: 14/240,566

(22) PCT Filed: Dec. 10, 2013

(86) PCT No.: PCT/SE2013/051477
§ 371 (c)(1),
(2) Date: Feb. 24, 2014

(87) PCT Pub. No.: WO2014/104960
PCT Pub. Date: Jul. 3, 2014

(65) Prior Publication Data
US 2015/0036519 A1 Feb. 5, 2015

Related U.S. Application Data

(60) Provisional application No. 61/746,310, filed on Dec. 27, 2012.

(51) Int. Cl.
*H04W 24/10* (2009.01)
*H04L 5/14* (2006.01)
(Continued)

(52) U.S. Cl.
CPC ............... *H04W 24/10* (2013.01); *H04L 5/14* (2013.01); *H04L 5/1469* (2013.01);
(Continued)

(58) Field of Classification Search
CPC .... H04W 24/10; H04W 72/1278; H04L 5/14; H04L 5/1469; H04L 5/0007
(Continued)

(56) References Cited

U.S. PATENT DOCUMENTS

| 2011/0026422 | A1* | 2/2011 | Ma | H04W 72/0453 |
| | | | | 370/252 |
| 2011/0170496 | A1* | 7/2011 | Fong | H04L 5/0053 |
| | | | | 370/329 |

(Continued)

FOREIGN PATENT DOCUMENTS

| EP | 2605580 A1 * | 6/2013 | ............ H04W 36/20 |
| WO | 2009062115 A2 | 5/2009 | |
| WO | 2012047144 A1 | 4/2012 | |

OTHER PUBLICATIONS

Shen et al. "Dynamic Uplink-Downlink Configuration and Interference Management in TD-LTE." Technology Updates on LTE Advanced. IEEE Communications Magazine. Nov. 2012. 51-59.

(Continued)

*Primary Examiner* — Andrew Chriss
*Assistant Examiner* — Ellen Kirillova
(74) *Attorney, Agent, or Firm* — Sage Patent Group

(57) ABSTRACT

According to one aspect of the teachings herein, a base station (20), wireless device (12), or other network node (36), determines composite dynamic subframe, CDS, information for a Time Division Duplex, TDD, carrier frequency used for transmitting one or more TDD carriers (22) of interest, from respective cells (18) in a wireless communication network (10). The CDS information identifies or otherwise indicates that one or more subframes in one or more of the TDD carriers (22) are dynamic subframes having a dynamically changeable uplink or downlink direction. The measurement configuration of the wireless device (12) is adapted according to the CDS information, so that (Continued)

| CARRIER | DYNAMIC TDD INDICATOR | DYNAMIC SUBFRAMES |
|---------|----------------------|-------------------|
| $f_1$ | 0 | 0 |
| $f_2$ | 1 | 3, 8 |
| $f_3$ | 1 | 8 |
| $f_4$ | 0 | 0 |
| ... | ... | ... | radio measurements performed by the device (12) with respect to the one or more TDD carriers (22) accounts for the dynamic subframes, e.g., by avoiding measurements on the dynamic subframes, increasing the number of measurements made, or increasing the measurement intervals.

36 Claims, 14 Drawing Sheets

(51) Int. Cl.
*H04W 72/12* (2009.01)
*H04W 36/00* (2009.01)
*H04L 5/00* (2006.01)

(52) U.S. Cl.
CPC ....... *H04W 72/1278* (2013.01); *H04L 5/0007* (2013.01); *H04L 5/0044* (2013.01); *H04W 36/0061* (2013.01)

(58) Field of Classification Search
USPC .......................................................... 370/252
See application file for complete search history.

(56) References Cited

U.S. PATENT DOCUMENTS

| | | | | |
|---|---|---|---|---|
| 2012/0230232 A1* | 9/2012 | Ji | ................... | H04B 7/2643 370/280 |
| 2012/0250641 A1* | 10/2012 | Sartori | ................... | H04W 48/12 370/329 |
| 2012/0263057 A1* | 10/2012 | Choi | ................... | H04W 28/048 370/252 |
| 2012/0320806 A1* | 12/2012 | Ji | ................... | H04B 7/2656 370/280 |
| 2013/0188516 A1* | 7/2013 | He | ................... | H04W 28/16 370/254 |
| 2013/0194980 A1* | 8/2013 | Yin | ................... | H04L 1/1854 370/280 |
| 2013/0322235 A1* | 12/2013 | Khoryaev | ................... | H04W 24/10 370/229 |

OTHER PUBLICATIONS

3GPP. "3rd Generation Partnership Project; Technical Specification Group Radio Access Network; Further Enhancements to LTE TDD for DL-UL Interference Management and Traffic Adaptation; (Release 11)." 3GPP TR 36.828 V2.0.0. Jun. 2012. 1-107.

3GPP. "3rd Generation Partnership Project; Technical Specification Group Radio Access Network; Evolved Universal Terrestrial Radio Access (E-UTRA); Physical Channels and Modulation (Release 11)." 3GPP TS 36.211 V11.1.0. Dec. 2012. 1-4.

Unknown, Author. "New work item proposal for Further Enhancements to LTE TDD for DL-UL Interference Management and Traffic Adaptation—Core Part." CATT. 3GPP TSG-RAN Meeting #58. RP-121772. Barcelona, Spain. Dec. 4-7, 2012. 1-6.

Unknown, Author. "New work item proposal for Further Enhancements to LTE TDD for DL-UL Interference Management and Traffic Adaptation—Feature." CATT. 3GPP TSG-RAN Meeting #58. RP-121772. Barcelona, Spain. Dec. 4-7, 2012. 1-5.

Unknown, Author. "New work item proposal for Further Enhancements to LTE TDD for DL-UL Interference Management and Traffic Adaptation—Performance Part." CATT. 3GPP TSG-RAN Meeting #58. RP-121772. Barcelona, Spain. Dec. 4-7, 2012. 1-4.

* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

*PRIOR ART*
*FIG. 1*

| SPECIAL SUBFRAME CONFIGURATION | NORMAL CYCLIC PREFIX IN DOWNLINK | | | EXTENDED CYCLIC PREFIX IN DOWNLINK | | |
|---|---|---|---|---|---|---|
| | DwPTS | UpPTS | | DwPTS | UpPTS | |
| | | NORMAL CYCLIC PREFIX IN UPLINK | EXTENDED CYCLIC PREFIX IN UPLINK | | NORMAL CYCLIC PREFIX IN UPLINK | EXTENDED CYCLIC PREFIX IN UPLINK |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | --- | --- | --- |
| 8 | $24144 \cdot T_s$ | | | --- | --- | --- |

*FIG. 2*

| CARRIER | DYNAMIC TDD INDICATOR |
|---|---|
| $f_1$ | 0 |
| $f_2$ | 1 |
| $f_3$ | 1 |
| $f_4$ | 0 |
| ... | ... |

*FIG. 6*

| CARRIER | DYNAMIC TDD INDICATOR | DYNAMIC SUBFRAMES |
|---|---|---|
| $f_1$ | 0 | 0 |
| $f_2$ | 1 | 3, 8 |
| $f_3$ | 1 | 8 |
| $f_4$ | 0 | 0 |
| ... | ... | ... |

FIG. 7

| TDD CARRIER | SUBFRAMES WHERE UE PERFORMS RADIO MEASUREMENTS |
|---|---|
| $f_1$ | 0, 3, 8 |
| $f_2$ | 0 |
| $f_3$ | 1, 3 |
| $f_4$ | 0, 3, 8 |
| ... | ... |

*FIG. 8*

METHOD AND APPARATUS FOR MEASUREMENT PROCEDURES WITH COMPOSITE DYNAMIC SUBFRAMES IN DYNAMIC TDD

TECHNICAL FIELD

The present invention generally relates to wireless communication networks, and particularly relates to wireless communication networks that use dynamic Time Division Duplexing, or TDD.

BACKGROUND

In communication networks based on the Long Term Evolution, LTE, specifications promulgated by the Third Generation Partnership Project, or 3GPP, two radio frame structures are supported; namely, a "type 1" structure that is applicable to Frequency Division Duplexing, FDD, and a "type 2" structure applicable to Time Division Duplexing, TDD. In both frame structure types, each radio frame of 10 ms is divided into two half-frames of 5 ms, and each half-frame includes five subframes of length 1 ms.

Further, in frame structure type 2, each subframe is a downlink subframe, an uplink subframe, or a special subframe, giving rise to different TDD configurations. Such configurations are in the table of FIG. 1. These configurations are defined in Table 4.2-2 of the 3GPP Technical Specification, TS 36.211.

The supported uplink-downlink configurations in LTE TDD are depicted in FIG. 1, where, for each subframe in a radio frame, "D" denotes the subframe is reserved for downlink transmissions, "U" denotes the subframe is reserved for uplink transmissions and "S" denotes a special subframe with the three fields: DwPTS, GP and UpPTS. The length of DwPTS and UpPTS is given by the table of FIG. 1 subject to the total length of DwPTS, GP and UpPTS being equal to 1 ms. Each subframe consists of two slots, each of length 0.5 ms.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission regardless of switchpoint periodicity. UpPTS and the subframe immediately following the special subframe are always reserved for uplink transmission.

In a TDD cell within a wireless communication network, a TDD configuration is characterized by both the uplink-downlink configuration and the special subframe configuration. Therefore the term "TDD configuration" used hereinafter refers to a combination of an uplink-downlink configuration configured in a TDD cell, e.g. one of the configurations depicted in the table of FIG. 1, along with a special subframe configuration, e.g., one of the configurations depicted in the table of FIG. 2. The choice of uplink-downlink configuration and the special subframe configuration are not necessarily related to each other. Of course, it will be understood that these are example configurations and additional TDD configurations may be introduced in the future, and the teachings herein are not limited to these example configurations.

Dynamic TDD, e.g., dynamically changing TDD configurations, may be used to better adapt to changing network deployments and usage. For example, it is envisioned that there will be more and more localized traffic in the future, where most of network users will be in hotspots, or in indoor areas, or in residential areas. These users will be located in clustered nature and will produce different UL and DL traffic at different times. This circumstance essentially means that a dynamic feature to adjust the UL and DL resources to instantaneous (or near instantaneous) traffic variations would be required in future local area cells. TDD has a potential feature where the usable band can be configured in different time slots to either UL or DL. It allows for asymmetric UL/DL allocation, which is a TDD-specific property, and not possible in FDD. There are seven different UL/DL allocations in LTE, providing 40%-90% DL resources as shown in the table of FIG. 1. The different TDD configurations are also shown in FIG. 3.

In current networks, UL/DL configuration is semi-statically configured, thus it may not match the instantaneous traffic situation. This mismatch results in inefficient resource utilization in both UL and DL, especially in cells with a small number of users. Dynamic TDD addresses this issue by dynamically configuring the TDD UL/DL asymmetry to better match the current traffic situation, and thereby optimize or at least improve the user experience. See 3GPP TR 36.828 V2.0.0 (2012-06). The dynamic TDD approach also can be utilized to reduce network energy consumption.

Thus, the typical use of fixed TDD configurations in existing TDD networks, which fixes which subframes are uplink subframes and which subframes are downlink subframes, should be understood as limiting the ability to address changing uplink/downlink asymmetry arising from varying traffic situations. One approach to increasing TDD configuration flexibility, at least in some scenarios, is based on the idea that each subframe (or part of a subframe) belongs to one of three different types:

Downlink subframes (exist in Rel-8) are used (among other things) for transmission of downlink data, system information, control signaling and hybrid-ARQ feedback in response to uplink transmission activity. The UE monitors PDCCH as in Rel-8, i.e., it may receive scheduling assignments and scheduling grants. Special subframes are similar to downlink subframes except, in addition to the downlink part, they also include a guard period as well as a small uplink part in the end of the subframe to be used for random access or sounding.

Uplink subframes (exist in Rel-8) are used (among other things) for transmission of uplink data, uplink control signaling (channel-status reports), and hybrid-ARQ feedback in response to downlink data transmission activity. Data transmission on the PUSCH in uplink subframes is controlled by uplink scheduling grants received on a PDCCH in an earlier subframe.

Flexible subframes (do not exist in Rel-8), which may be referred to as "DKWTA subframes," may either be used for uplink or downlink transmissions, as determined by scheduling assignments/grants.

Semi-static configuration is used to assign each subframe either as uplink or as downlink subframe as illustrated in FIG. 3. The semi-static configuration of subframe types may be accomplished by Medium Access Control, MAC, Control Element or CE, or Radio Resource Control (RRC), or specific Radio Network Temporary Identifier, or RNTI, on the Physical Downlink Control Channel or PDCCH. Configuration information could be part of the system information as in Rel-8. In dynamic TDD, an additional subframe type is added, labelled as "DKWTA" subframes as shown in FIG. 4. The dynamic TDD configuration information can be signaled to terminals in different ways, for example, either by explicitly indicating "UL", "DL", or "DKWTA" or by signaling "DL" and "UL" using the Rel-8 signaling message and then using an additional signaling message, understandable by new terminals only, where some UL subframes are changed into Flexible subframes.

From a dynamic TDD enabled UE perspective, Flexible subframes are treated in a similar way as DL subframes unless the UE has been instructed to transmit in a particular Flexible subframe. Expressed differently, Flexible subframes not assigned for uplink transmission from a particular UE are, from a PDCCH perspective, treated as a DL subframe. Hence, the UE monitors several candidate PDCCHs in a Flexible subframe. If the control signaling indicates that the UE is supposed to receive downlink data transmission on the Physical Downlink Shared Channel (PDSCH), the UE will receive and process the PDSCH as in a DL subframe. Similarly, if the control signaling contains an uplink scheduling grant valid for a later subframe, the UE will transmit in the uplink accordingly.

The terms dynamic TDD, flexible TDD, flexible UL/DL allocation, adaptive TDD, reconfigurable TDD, etc., are interchangeably used, but they all refer to the same concept. With dynamic TDD, one or more "dynamic" or "flexible" subframes can be used in different directions of transmission (i.e., UL versus DL) in different cells, which may belong to the same carrier or different carriers. Furthermore, the direction of flexible subframes in a particular cell can be changed over time, e.g., as fast as every radio frame. The controlling radio network node can decide whether and when to change the direction of a flexible subframe independently, or depending upon the TDD configuration used in one or more neighboring TDD cells. In principle any subframe that is not adjacent to "special subframe (S)" can be configured as a flexible subframe. For example in TDD configuration 0, as shown in FIG. 1, any of the subframes 3, 4, 8 and 9 can be configured as a flexible subframe.

While dynamic UL/DL allocation in theory should provide a good match of allocated resources to instantaneous traffic, different UL and DL transmission in neighboring cells also causes issues related to handover, HO, measurements by the UEs.

In LTE, each eNB sends cell configuration information of each cell in the eNB to neighboring eNBs over the X2 interface, as defined in TS 36.423 Release 8. The information also contains TDD-related information, e.g. UL DL configuration, special subframe configuration, etc. In principle, then, Release 8 provides for use of dynamically updated TDD configurations. In practice, however, dynamic TDD configurations have not been used, primarily because of the lack of interference mitigation techniques needed to alleviate interference caused by the use of dynamic TDD configurations. See, e.g., 3GPP TR 36.828 V2.0.0 (2012-06). However, work is ongoing with respect to related procedures. See, e.g., RP-121772, "Further Enhancements to LTE TDD for DL-UL Interference Management and Traffic Adaptation", WID approved at 3GPP RAN#58.

UEs perform one or more measurements on the signals from the cells neighboring their serving cell. Such measurements support a variety of functions, such as mobility-related functions for cell selection/re-selection, handover, RRC re-establishment, connection release with redirection, minimization-of-drive tests, Self-Organizing Network, SON, positioning, etc. A UE must identify a cell and determine its Physical Cell Identity, PCI, prior to making such measurements. In this regard, PCI determination itself may be viewed as a type of measurement.

To perform requested measurements, the UE may receive measurement configuration information, or assistance data, such as a message or Information Element, IE, sent by an involved network node. The node may be a serving eNB, for example, or a positioning node, or some other node in the network. The information provided to the UE may contain information related to the carrier frequency, Radio Access Technologies or RATs, type of measurement, higher layer time domain filtering, measurement bandwidth related parameters, etc. One type of measurement is Reference Symbol Received Power, or RSRP.

Such measurements are done by the UE on the serving as well as on neighbor cells over known reference symbols or pilot sequences. The measurements may be performed on cells on an intra-frequency carrier, inter-frequency carrier(s), as well as on inter-RAT carriers(s) (depending upon the UE capability to supports other RATs).

The network configures measurement gaps, to enable the UE to make inter-frequency and inter-RAT measurements. Two periodic measurement gap patterns both with a measurement gap length of 6 ms are defined for LTE:

Measurement gap pattern #0 with repetition period 40 ms
Measurement gap pattern #1 with repetition period 80 ms In High Speed Packet Access or HSPA, the inter-frequency and inter-RAT measurements are performed in compressed mode gaps, which are also a type of network configured measurement gaps. Some measurements may also require the UE to measure the signals transmitted by the UE in the uplink. The measurements are done by the UE in RRC connected state or in CELL_DCH state (in HSPA), as well as in low activity RRC states (e.g. idle state, CELL_FACH state in HSPA, URA_PCH and CELL_PCH states in HSPA, etc.). In multi-carrier or Carrier Aggregation, CA, scenarios, the UE may perform the measurements on the cells on the primary component carrier, PCC, as well as on the cells on one or more secondary component carriers, or SCCs.

Such measurements are typically performed over longer time duration, e.g., in the order of few 100 ms to few seconds. The same measurements are applicable in single carrier and CA. However, CA contexts may involve different measurement requirements. For the measurement period in a CA scenario may be either more relaxed or more stringent, depending upon whether the SCC is activated or not. The requirement may also depend upon the UE capability, such as whether the UE is able to perform measurements on the SCC without gaps.

In addition to the RSRP measurement identified earlier, the Reference Symbol Received Quality or RSRQ stands as another example of mobility measurements made in LTE. Example mobility measurements in HSPA include Common pilot channel received signal code power, or CPICH RSCP, and CPICH Ec/No (which is a noise-based ratio). Further mobility measurement examples in the context of GSM/GERAN include GSM carrier Received Signal Strength Information or RSSI, and in the context of CDMA2000 include pilot strength for CDMA2000 1×RTT and pilot strength for High Rate Packet Data or HRPD.

As noted, mobility measurements generally include detecting/identifying a cell, which may belong to LTE, HSPA, CDMA2000, GSM, etc. Cell detection includes identifying at least the PCI and subsequently performing the signal measurement (e.g. RSRP) of the identified cell. The UE may also have to acquire the cell global ID, or CGI. In HSPA and LTE, the serving cell can request that the UE acquire the System Information, SI, of the target cell. More specifically, the UE acquires the CGI of the target cell from the SI. The UE may also be requested to acquire other information from the target cell, such as Closed Subscriber Group, CSG, information, CSG proximity detection.

Example positioning measurements in LTE include Reference Signal Time Difference or RSTD measurements, and UE Receive (RX)/Transmit (TX) time difference measurements. The latter measurement requires the UE to perform measurement on the downlink reference signal, as well as on its uplink transmitted signals.

Examples of other measurements useful for radio link maintenance, minimization-of-drive-time, SON, etc., include control channel failure rate or quality estimate measurements, e.g., determination of the Paging channel failure rate and/or the Broadcast channel failure rate. Measurement may also provide detection of physical layer problems, such as detecting whether the UE is in or out of synchronization, and radio link monitoring and/or failure detection.

Still further, Channel State Information, or CSI, measurements performed by the UE are used for scheduling, link adaptation, etc., by the network. Examples of CSI measurements include the determination Channel Quality Information, CQI, which may comprise a value indicating a signal-to-noise-ratio, SNR, or signal-to-noise-plus-interference ratio, SINR, at the UE, a Precoder Matrix Indicator, PMI, which may index into a known codebook of multi-antenna transmit precoders or otherwise identify a Precoder Matrix suggested for use in transmitting to the UE, and a Rank Indicator, RI, which indicates the transmission rank or number of spatial multiplexing layers that can be supported by the UE given measured channel conditions.

At least some of the radio measurements performed by the UE are used by the UE for one or more radio operational tasks. Examples of such tasks are reporting the measurements to the network, which in turn may use them for various tasks. For example in the RRC connected state, the UE reports radio measurements to the serving node. In response to the reported UE measurements, the serving network node takes certain decisions, e.g., it may send mobility commands to the UE for the purpose of initiating cell changes. Examples of cell change are handover, RRC connection re-establishment, RRC connection release with redirection, Primary or PCell change in CA, etc. Cell reselection represents an example of cell change when the UE is in an idle or low activity state. As another example the UE may itself use the radio measurements for performing tasks, such as cell selection, cell reselection etc.

Of course, radio network nodes, such as Node Bs in WCDMA networks and eNBs in LTE networks, make certain radio measurements to support mobility, positioning, link adaptation, scheduling, loading balancing, admission control, interference management and/or mitigation, etc. These measurements may be performed on signals transmitted by the radio network node and/or on signals received by the radio network node, and example measurements include SNR or SINR determinations, Received Interference Power or RIP measurements, Block Error Rate, BLER, estimations, propagation delay measurements, transmit carrier power, transmit power(s) of one or more other signals, e.g., of reference signals, along with measurements for positioning. The teachings herein will be understood as being applicable to these and the previously discussed types of measurements.

As a further consideration, Release 10 for LTE specifies time domain enhanced Inter-Cell Interference Coordination or eICIC, for use in mitigating interference in so-called heterogeneous networks. Such networks comprise a mix of high power and lower power nodes. For example, a heterogeneous network may include a number of eNBs or other high-power base stations, sometimes referred to as "macro" base stations, each providing service in one or more "macro" cells that may be regarded as comprising a "macro" layer of the network. One or more of these macro cells are overlaid by a smaller, "micro" or "pico" cell or hotspot, served by a low-power base station or access point. Such low-power nodes are often referred to as micro, pico, or femto base stations or nodes. A given micro node may comprise a Home eNB, HeNB, or may simply comprise one or more low-power base stations used to extend or enhance coverage within a macro cell.

According to the time domain eICIC scheme, a time domain pattern of low interference subframes, which are also referred to as "low interference patterns" or Almost Blank Subframe, ABS, patterns. The low interference subframes are configured in an aggressor node, which may be a macro eNB. More specifically, an ABS pattern is configured in an aggressor cell to protect resources in subframes in a victim cell that receives strong inter-cell interference. The victim cell may be a pico cell that overlays or is nearby the aggressor cell.

ABS subframes are typically configured with reduced transmit power or no transmit power and/or reduced activity on some of the physical channels. In an ABS subframe, the basic common physical channels, such as Common Reference Signal, CRS, Primary Synchronization Signal, PSS, Secondary Synchronization Signal, SSS, Primary Broadcast Channel, PBCH, and System Information Block 1, or SIB1, are transmitted to ensure the proper operation of legacy UEs.

The ABS pattern can also be categorized as non-MBSFN and MBSFN, wherein "MBSFN" denotes Multi-cast/Broadcast Single Frequency Network. In a non-MBSFN ABS pattern, the ABS can be configured in any subframe, including MBSFN or non-MBSFN configurable subframes. In a MBSFN ABS pattern, an ABS can be configured only in MBSFN configurable subframes, i.e., subframes 1, 2, 3, 6, 7 and 8 in FDD and subframes 3, 4, 7, 8 and 9 in TDD.

The serving eNB (e.g. a pico eNB) signals one or more measurement patterns (also referred to as measurement resource restriction patterns), to inform a UE about the resources or subframes which the UE should use for performing measurements on a target victim cell (e.g. the serving pico cell and/or neighboring pico cells). The patterns can be different for serving cell measurements, neighbor cell measurements, etc. The resources or subframes on which the measurements are to be done by the UE overlap with ABS subframes in the aggressor cell(s). As such, these resources or subframes within a measurement pattern are protected from aggressor cell interference and are interchangeably also referred to as "protected subframes" or "restricted subframes."

The serving eNB ensures that each measurement pattern contains at least a certain number of protected subframes in every radio frame—e.g., one to two—to facilitate the performance of measurements by a UE. Without the inclusion of protected subframes, the UE generally cannot meet the predefined measurement requirements, when the UE is configured with measurement patterns related to operation in the heterogeneous network.

Turning to multi-carrier or CA, as referenced earlier, such techniques offer the opportunity to enhance peak rates. Using LTE as an example case, multiple 20 MHz carriers or even smaller carriers (e.g. 5 MHz) can be aggregated in the UL and/or on DL. Each carrier in a multi-carrier or CA system is generally termed as a component carrier, CC, or sometimes referred to simply as a "cell." Regardless, each CC represents an individual carrier in a multi-carrier system. The use of CA also may be referred to as a "multi-carrier system," "multi-cell operation," "multi-carrier operation," or "multi-carrier" transmission and/or reception.

CA may be used for transmission of signaling and data in the uplink and/or downlink directions. One of the CCs in CA operates as the PCC or simply primary carrier or even anchor carrier. The remaining carriers are SCCs, as mentioned earlier herein, or simply secondary carriers or even supplementary carriers. Generally the primary or anchor CC carries the essential UE-specific signaling. The primary CC (aka PCC or PCell) exists in both uplink and downlink directions in CA. In case there is a single UL CC, the PCell is on that CC. The network may assign different primary carriers to different UEs operating in the same sector or cell.

Therefore, a UE has more than one serving cell in the downlink and/or in the uplink: one primary serving cell and one or more secondary serving cells operating on the PCC and SCC respectively. The serving cell is interchangeably called as primary cell, PCell, or primary serving cell, PSC. Similarly the secondary serving cell is interchangeably called as secondary cell, SCell, or secondary serving cell, SSC. Regardless of the terminology, the PCell and SCell(s) enable the UE to receive and/or transmit data. More specifically the PCell and SCell exist in the DL and UL for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g. 2 CCs in band A and 1 CC in band B). Inter-band CA includes carriers distributed over two bands in LTE. Furthermore, the CCs in intra-band CA may be adjacent or non-adjacent in frequency domain (aka intra-band non-adjacent CA). A hybrid CA that includes intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation." For example, the carriers from a WCDMA network and an LTE network may be aggregated. Another example is the aggregation of LTE and CDMA2000 carriers. Yet another example is the aggregation of LTE FDD and LTE TDD carriers. For the sake of clarity the carrier aggregation within the same technology as described can be regarded as "intra-RAT" or simply "single RAT" carrier aggregation.

Multi-carrier operation may also be used in conjunction with multi-antenna transmission. For example signals on each CC may be transmitted by a eNB to a UE over two or more antennas. Generally, the CCs in a CA deployment may or may not be co-located in the same site or base station or radio network node (e.g. relay, mobile relay etc). For instance the CCs may originate (be transmitted or received) at different locations (e.g. from non-co-located BS or from BS and Remote Radio Heads, RRHs, or Remote Radio Units, RRUs). The well-known examples of combined CA and multi-point communication are Distributed Antenna Systems, or DAS, RRH, RRU, Coordinated Multi-Point, or CoMP, transmission/reception etc. The teachings herein are applicable to CCs in a CA context, and/or to CoMP.

Turning to positioning examples, there are a number of positioning methods known for determining the location of a target wireless device, which can be a UE, mobile relay, PDA, a Machine Type Communication, MTC, device (also known as "M2M" device), a laptop or other computer, a modem or other network adaptor, an eNB or other radio network node, a Location Measurement Unit, LMU, or other dedicated positioning node, or essentially any other type of wireless communication apparatus. In any case, the position of the target device is determined by using one or more positioning measurements, which can be performed by a suitable measuring node or the target device.

In LTE, an Evolved Serving Mobile Location Center or E-SMLC operates as positioning node, providing various positioning-related services and functions. For example, the positioning node configures the target device to perform one or more positioning measurements, depending upon the positioning method and/or requirements involved. The positioning measurements are used by the target device or by a measuring node or by the positioning node to determine the location of the target device. In LTE the positioning node communicates with UE using LTE positioning protocol, LPP, and with eNBs using LTE positioning protocol annex, or LPPa.

There are several well known positioning methods used in wireless communication networks, e.g., in LTE and other cellular networks. Examples include satellite methods, where positioning measurements are performed by the target device on signals received from navigational satellites and are used for determining the target device's location. For example either GNSS or A-GNSS (e.g. A-GPS, Galileo, COMPASS, GANSS, etc.) measurements are used for determining position of a UE or other target device.

The observed time difference of arrival or OTDOA method uses target device measurements related to time difference of arrival of signals from network radio nodes for determining the position of the target device. In an LTE example, reference signal received time difference, or RSTD, measurements are performed by a UE in a LTE network, for positioning the UE.

Similarly, with uplink time difference of arrival or UTDOA techniques, a measuring node performs measurements on uplink signals received from a target device. The measuring node may be a LMU in a LTE or other cellular network and the target device may be a UE. A positioning node or other location server in the network may use the LMU measurements from multiple LMUs for determining the position of the target device.

Another approach uses enhanced Cell ID or E-CID. Here, the cell ID of a serving and/or a neighboring cell and at least one additional radio measurement performed by the target device or by a radio node. For example, the E-CID method typically uses any combination of cell ID and radio measurements, such as UE Rx-Tx time difference, BS Rx-Tx time difference, timing advance, TA, measured by the BS, LTE RSRP and/or RSRQ, HSPA CPICH measurements, angle of arrival, AoA, measured by the BS on UE transmitted signals, etc., for determining the position of the target device.

Hybrid methods are also known. A hybrid positioning method incorporates positioning measurements related to more than one positioning method, for determining the position of the target device. For example, a hybrid method may use A-GNSS measurements and OTDOA RSTD measurements for determining the position of the target device. Hybrid methods can improve the overall accuracy of positioning, as compared to that obtained based on an individual method.

With the above information in mind, it will be appreciated that a UE or other wireless device or apparatus operating within a wireless communication network may have to make numerous types of radio signal or other measurements, e.g., on a repeating or triggered basis. For example, a UE may be required to perform certain radio measurement in the DL and/or UL subframes of one or more target cells, for use in various tasks.

SUMMARY

When a wireless device does not know the Time Division Duplex, TDD, configuration, e.g., the uplink/downlink allocations, in a target cell or cells, there is a potential that the device will perform certain measurements at inappropriate times. For example, the device may attempt to perform a Reference Signal Received Power, RSRP, measurement with respect to a neighboring cell, but may inadvertently make that measurement in an uplink subframe of the neighboring cell. In such cases, the perceived RSRP will be very low, even in cases where the device is close to the transmitting radio node. Accordingly, in one aspect of the teachings herein, a base station, wireless device, or other network node, determines composite dynamic subframe, CDS, information for a Time Division Duplex, TDD, carrier frequency used for transmitting one or more TDD carriers of interest, from respective cells in a wireless communication network.

The CDS information identifies or otherwise indicates that one or more subframes in one or more of the TDD carriers are dynamic subframes having a dynamically changeable uplink or downlink direction. Radio measurements performed by the wireless device with respect to the one or more TDD carriers are adapted according to the CDS information, to account for the dynamic subframes, e.g., to avoid measurements on the dynamic subframes, or to increase the number of measurements made and/or increase the measurement intervals.

Among the several advantages of the teachings herein, providing CDS information on a per carrier basis greatly reduces the signaling overhead needed to inform a wireless device regarding the presence of dynamic subframes for a given set of carriers on a given carrier frequency. Additionally, or alternatively, use of the CDS information alleviates the need to provide per cell dynamic subframe information, which approaches may be prohibitive in networks with many cells or cell clusters. Further benefits include reduced energy consumption at the device and/or more reliable measurements, as a consequence of adapting the device's measurements with respect to the one or more target cells, in accordance with the CDS information.

In an example case, a base station or other network node is configured for operation in a wireless communication network, e.g., a cellular network configured according to Long Term Evolution, LTE, standards. The network node implements a method that includes determining CDS for a first TDD carrier frequency used by one or more TDD carriers transmitted by a respective one or more cells in the network.

The method further includes sending the CDS information to a wireless device operating in the network, for use by the wireless device in performing radio measurements with respect to the dynamic subframes in the one or more TDD carriers. The CDS information is subject to any formatting and/or encoding associated with the transmission of signaling to the device. Further, the CDS information sent to the device may comprise a subset of a larger set of CDS information, or may comprise information derived from richer CDS information, e.g., logical flags that have a defined meaning at the device with respect to CDS information. In some embodiments, the network node is configured to share the CDS information with other network nodes, e.g., for transmission to wireless devices connected to such other network nodes.

In a corresponding device-side example, a wireless device is configured for operation in a wireless communication network. According to example teachings herein, the wireless device is configured to implement a method that includes obtaining CDS information for a first TDD carrier frequency used by one or more TDD carriers transmitted by a respective one or more cells in the network. The method further includes performing radio measurements with respect to the one or more TDD carriers according to the CDS information.

In some embodiments, the device obtains the CDS information based on receiving the CDS information from a node in the network, e.g., a serving base or other node in the network sends an indication of the CDS information to the device. In other embodiments, the device determines the CDS information based on making measurements on the one or more TDD carriers. In any case, performing radio measurements according to the CDS information comprises, for example, adapting measurements made by the device with respect to the one or more TDD carriers, to account for the dynamic subframes. Example adaptations include avoiding making measurements on the one or more TDD carriers during the dynamic subframes, making a greater number of measurements, or extending the measurement interval(s). The radio measurements in question may be, for example, Radio Resource Management, RRM, measurements made by the device on a recurring or triggered basis.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a table illustrating example Time-Division-Duplex, TDD, configurations as known from 3GPP TS 36.211.

FIG. 2 is a table illustrating example known TDD configurations that include special subframes.

FIGS. 6 and 7 are tables illustrating a known arrangement for information elements used to signal dynamic subframes.

FIG. 8 is a table illustrating example subframes where a User Equipment or other wireless device performs radio measurements.

DETAILED DESCRIPTION

Figure 3:
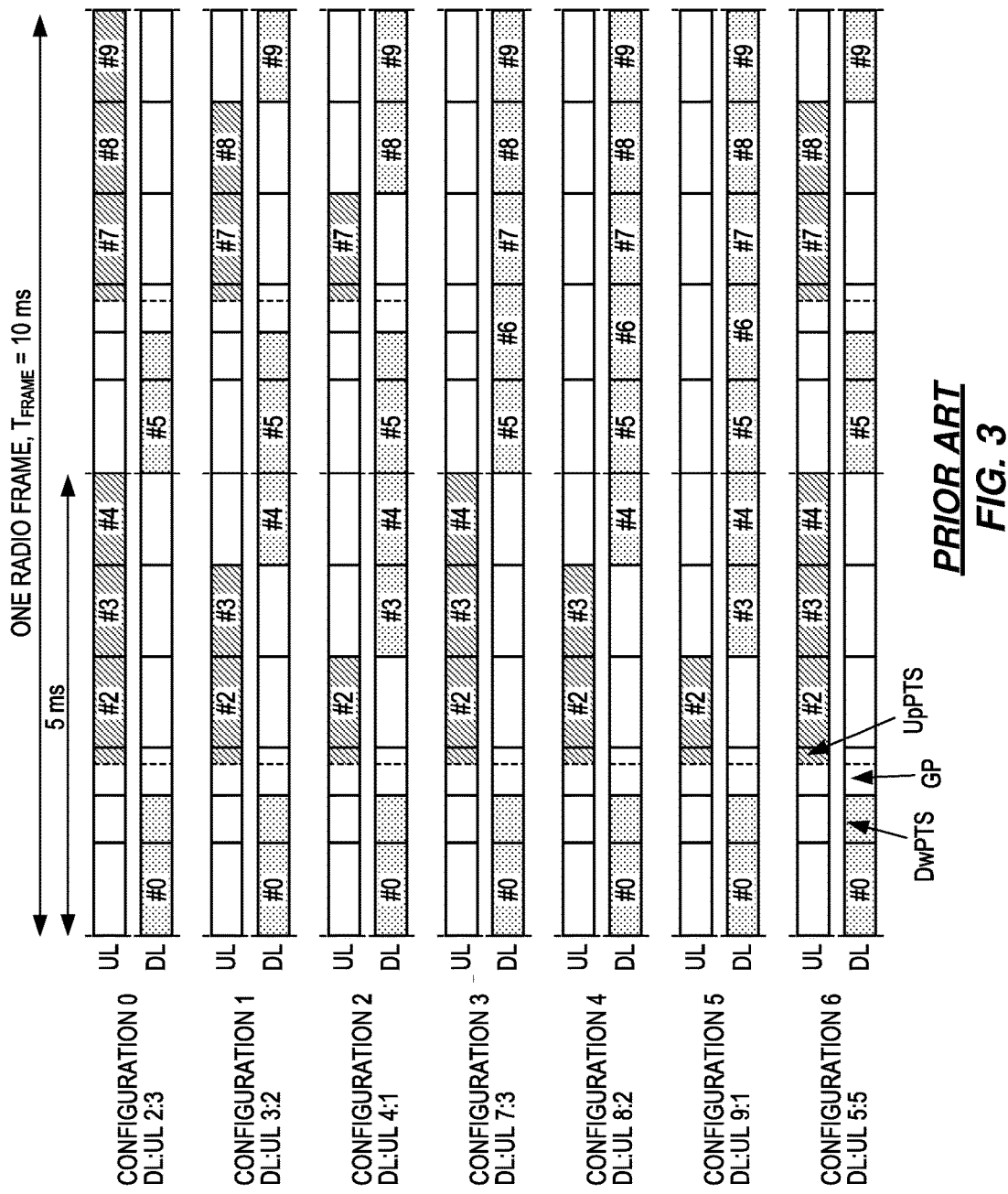
FIG. 3 is a diagram illustrating different mixes for uplink, downlink, and special subframes, for a number of TDD configurations defined in Long Term Evolution or LTE.
Figure 4:
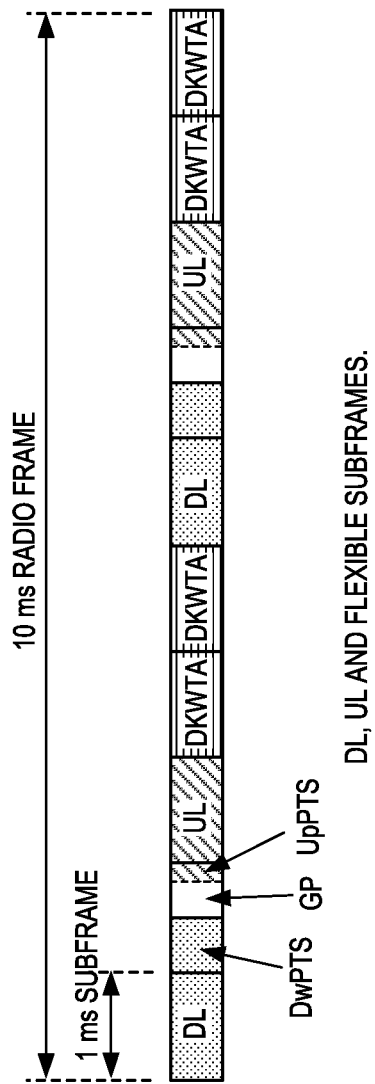
FIG. 4 is a diagram illustrating further details known for special subframes within an LTE radio frame.
Figure 5:
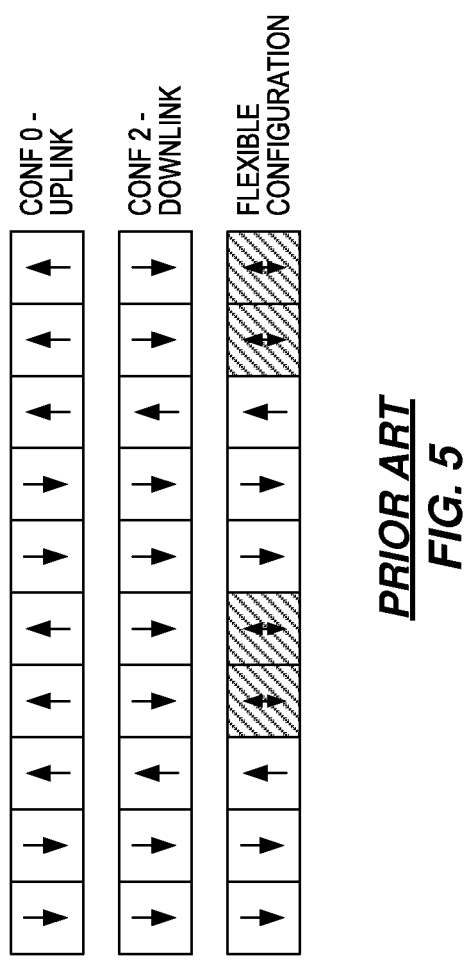
FIG. 5 is a diagram illustrating known example details for dynamic TDD configurations, involving dynamic subframes.

In an example network using dynamic TDD, the UL/DL configurations are arranged as shown in FIG. 5. As a basis for the dynamic TDD, each subframe in a frame is defined as a downlink subframe, an uplink subframe or a flexible subframe. This arrangement can be signaled, for example, with reference to two different TDD configurations from a defined list of configurations, where the subframes that differ between the configurations are considered flexible. The static subframes can be used for measurements, semi-static allocations and for control channel feedback such as HARQ. The direction of the flexible subframes can be controlled fully from a scheduler, in a manner similar to that done for half duplex, where a subframe is considered as being a downlink subframe unless the user has been scheduled for uplink.

In this particular example, a legacy UE will be informed about the UL heavy configuration, e.g., configuration 0. UEs capable of operation with dynamic TDD can use the additional information to find out which subframes are the flexible subframes. In the example of FIG. 5, only the third and fourth subframes can be used as flexible subframe. Here, note that the subframe count starts from zero. Other arrangements of flexible subframes can also be designed upon. For example only one of the third and fourth subframes can be used as flexible subframe, etc. The scheduler handles the UL/DL allocation in any given flexible subframe.

As elaborated in the Background section of this document, UEs perform radio measurements on neighbor cells, on one or more carrier frequencies, to support a variety of operational tasks. However, if a given UE is unaware of the usage of dynamic TDD in a given cell, it may inadvertently perform measurements on flexible subframes not suitable for those measurements.

In one aspect of the teachings herein, a network node implements a method whereby it performs one or more of the following operations:
  determining composite dynamic subframes per carrier;
  signaling information about composite dynamic subframes per carrier to UE;
  using information about composite dynamic subframes per carrier for measurement control; and
  forwarding information about composite dynamic subframes per carrier to other network nodes.

The term composite dynamic subframe(s) per carrier herein refers to all possible subframes in cells on a carrier whose direction (UL/DL) can change, at least in principle, from one radio frame to another.

The terms "composite flexible subframes," "composite dynamic subframe(s)," "composite configurable subframe(s)," "composite ambiguous subframes," "composite adaptive subframes," etc., have the same meaning herein. Further, the term "composite" implies composite dynamic or flexible subframes used in cells belonging to a given TDD carrier frequency.

An example of determining composite dynamic subframes is based on: acquiring information related to dynamic subframes in neighbor cells; and criteria for determining the composite dynamic subframes, based at least on the acquired information.

As for obtaining information related to dynamic subframes in neighbor cells, a radio network node obtains or acquires at least the information related to the dynamic subframes used or that are expected to be used in neighbor cells of the UE on each TDD carrier frequency. The information may be acquired for intra-frequency carrier, inter-frequency carrier or inter-RAT LTE TDD carrier, etc., depending upon the RAT of the serving cell. If the radio network node is a LTE TDD node, then it internally obtains at least the dynamic subframes used or that are expected to be used on the serving cell of the UE.

The radio network node may also acquire additional information related to the dynamic subframes that are used, or which are expected to be used, in serving and neighbor cells on each TDD carrier. Examples of additional information are:
  The rate at which a dynamic subframe can change direction, e.g., from UL to DL or from DL to UL. The rate can be different in the different change of directions. The "rate" can be expressed in terms of one or more parameters, such as: (a) probability with which the subframe direction can change, e.g., 0.5 to change from DL to UL or vice versa; (b) a discrete level indicating the rate at which the subframe direction can change, e.g., high, medium and low; and (c) a frequency at which the subframe direction can change, e.g., change DL to UL or vice versa at a frequency not faster than once every 100 ms; and
  signal quality or expected signal quality of signal received from a neighbor cell at the UE, e.g., RSRP, RSRQ, etc., expected to be measured by the UE or measured by other UEs close to the UE.

A network node, such as a base station, may acquire the above information by one or more of the following mechanisms: explicit, implicit or pre-defined. In one example of an explicit mechanism, the radio network node may directly receive an explicit indication from the neighboring cells about the dynamic subframes used, or expected to be used, in those cells and the acquired information may also include additional information associated with the dynamic subframes. In an example, such information is exchanged over the X2 interface between eNBs in the Radio Access Network, RAN, portion of an LTE network.

In another example, the network node also may receive the above information from another network node that is aware of the dynamic subframes to be used or which are expected to be used in different radio network nodes, on one or more carrier frequencies. Additional information associated with the dynamic subframes also may be received from the other network node. Examples of other network nodes are Operations & Maintenance, O&M, nodes, Operations Support Services, OSS, nodes, Self-Organizing Network, SON, nodes, etc.

In an example of the predefined mechanism, the network node may have pre-determined information about all the potential dynamic subframes that can be used in neighbor cells and the additional information associated with those potential dynamic subframes. The pre-determined information can be stored in the radio network node and the information can be updated when there is change in terms of "dynamic subframe usage" in any neighbor cells on a carrier.

As for the criteria for determining the composite dynamic subframes based at least on the acquired information, a network node (e.g. serving radio network node serving a UE) uses one or more criteria to determine the composite dynamic subframes on a carrier. The criteria for determining the composite dynamic subframes takes into account or uses at least one set of the acquired information described above. Based on the criteria, the network node determines the most suitable composite dynamic subframes used or expected to be used on each TDD carrier frequency.

The network node may be configured to determine the composite dynamic subframe(s) as all dynamic subframes used or expected to be used in:
- all cells on a carrier including the serving cell of a UE and neighbor cells of the UE;
- all neighbor cells of the UE on a carrier, whether it is serving carrier or neighbor carrier;
- on a selected set of cells on a carrier, which may be any combination of serving cell and neighbor cells of the UE;
- any set of cells listed above, provided their signal quality at the UE is above a threshold, e.g., RSRP is above −110 dBm and/or RSRQ is above −16 dB etc;
- any set of cells listed above, provided their rate of changing direction is higher than a threshold, e.g., probability of changing direction is 0.4 or above and/or frequency of changing direction is once every 40 ms, or more frequent, etc.;
- any of cells listed above and which can potentially be dynamic subframes, e.g., all subframes other than those which are adjacent to special subframes in time. For example in TDD configuration #0, subframes #3, #4, #8 and #9; subframes #0, #2, #5 and #7 are adjacent to special subframes #1 and #6.

In a first example of determining a "composite dynamic subframe," consider that a UE is operating in cell 1 on carrier frequency, f1. The serving cell 1 is served by a serving radio network node. Assume that TDD configuration #0 is configured in cell 1 and also in neighboring cells 2 and 3, which also operate on the serving carrier frequency f1. Assume that in cell 2 and cell 3, subframe #3 and subframe #8 are used as dynamic subframes. Further assume that cell 1 uses subframe #9 as a dynamic subframe.

In this example, the serving radio network node acquires information related to the dynamic subframes used in cell 2 and cell 3. It uses this acquired information for determining the composite dynamic subframes on f1 as explained later herein. For example the serving radio network node may receive an explicit indication from the neighboring cells about the dynamic subframes used in those cells, e.g., over the X2 interface between involved eNBs.

The serving radio network node may also receive this information from another network node that is aware of the dynamic subframes used or are expected to be used in different radio network nodes on one or more carrier frequencies. In an example determination, the serving radio network node determines composite dynamic subframes on f1 based on all dynamic subframes used only in all neighbor cells, but not the dynamic subframes used in the serving cell. Using the above assumptions, the serving radio network node determines the composite dynamic subframes on f1 as subframes #3 and #8, as these subframes are used in the neighboring cells 2 and 3 as dynamic subframes.

In another example configuration, the serving radio network node determines composite dynamic subframes on f1 based on all dynamic subframes used in the serving cell (cell 1) and also in all of the neighbor cells (cells 2 and 3). Using the above example assumptions, cell 1 uses subframe #9 as a dynamic subframe, and cells 2 and 3 use subframes #3 and #8 as dynamic subframes, and the serving radio network node thus determines the composite dynamic subframes as subframes #3, #8 and #9.

Another example uses the above assumptions regarding dynamic TDD configurations, but illustrates the consideration of additional information associated with the dynamic subframes. The serving radio node of the UE also obtains additional information associated with the dynamic subframes #3, #8, and #9.

In one example, the dynamic information can be the rate at which the link direction of the dynamic subframe can change. For example, for carrier frequency f1 in cells 1, 2 and 3, the serving radio network node may acquire additional information with respect to the dynamic subframe(s) at issue, indicating that the dynamic subframe(s) can change link direction once per 80 ms (subframe #3), once per 20 ms (subframe #9) and once per 500 ms (subframe #8).

In another example, the serving radio network node conditions its determination of the composite dynamic subframes based on a threshold rate of directional change. For example, it determines the composite dynamic subframes on carrier f1 as those dynamic subframes whose rate of change of direction is more than once per 100 ms. Using the above numbers, the dynamic subframes meeting the minimum rate of directional change are subframes #3 and subframes #9, and those subframes are determined to be the composite dynamic subframes on f1.

In another example, the serving radio network node determines the composite dynamic subframes on carrier f1 conditioned on the requirement that the rate of change of the direction of subframe is more than once per 50 ms. Using the example numbers from above, subframe #3 meets this requirement and thus is the only dynamic subframe determined to be a composite dynamic subframe on carrier f1. Having the serving radio network node condition the determination of which dynamic subframes are composite dynamic subframes has a number of advantages. For example, it can be more difficult for a UE to predict the direction of a dynamic subframe. For subframes that change their direction infrequently (e.g. subframe #8 used in cell 3 in the above example), the UE can more easily predict direction.

In another example, the radio network node determines both composite dynamic subframes and also composite semi-dynamic (aka semi-static) subframes on each carrier of interest. The semi-dynamic subframes are typically determined based on a basic criterion, e.g., all dynamic subframes on a carrier. Additional criteria may be considered, as well. For example, an additional criterion may be all those dynamic subframes on a given carrier whose direction changes more frequently than a given threshold. For example, the composite semi-dynamic subframes can be determined according to the scenario described in the above example. The radio network node may signal all such information to a UE, as described below.

While the above example details relate to determining the composite dynamic subframes and acquiring the information to make such determinations, the below details relate to a method in a radio network node of signaling information about composite dynamic subframes to a UE. Such signaling may be considered as being another aspect of the teachings presented herein. According to an example embodiment, a serving radio network node signals at least the information related to the composite dynamic subframes per TDD carrier frequency to the UE, to assist the UE in performing one or more radio measurements on one or more cells on each TDD carrier. The serving radio network node may also signal the information related to the composite semi-dynamic subframes to the UE, for each TDD carrier frequency.

The serving radio network node may perform such signaling based on signaling detailed information about the composite dynamic subframes per TDD carrier frequency, or by signaling a simple indication to the UE. As for example contents of the information signaled to the UE, according to one approach, the network informs the UE as to whether or not there are one or more composite dynamic subframes in one or more cells on a TDD carrier. The information is provided separately, for each of one or more TDD carriers.

In an example, the signaled information contains an indicator, e.g., a 1-bit Information Element or IE, and a carrier frequency indication for each carrier. The carrier frequency indication is, for example, an E-UTRA Absolute Radio Frequency Channel Number or EARFCN.

A 1 bit indicator may also be sent to indicate whether the neighbor cells on a TDD carrier have the same dynamic subframes as on the serving cell of the UE. The serving network node may signal this information to the UE, e.g., for the case where the UE does not have precise information about the dynamic subframes used in all neighboring cells on a particular TDD carrier.

Further, in case the network node indicates that there are "composite dynamic subframes" on a TDD carrier, the UE may assume that all potential dynamic subframes are "dynamic subframes" on the indicated TDD carrier. An example information element signaled to the UE is shown in the table depicted in FIG. 6.

The network may provide explicit information about all the "composite dynamic subframes" or "semi-dynamic subframes" on a TDD carrier. Alternatively, the network node signals information related to subframes which are not "composite dynamic subframes" or which are not "composite semi-dynamic subframes" on a TDD carrier to the UE. The signaled information also contains indication about each carrier frequency (e.g. EARFCN), which one or more cells operate with one or more dynamic subframes. The detailed information signaled to the UE is shown by way of example in the table of FIG. 7.

The contents of the signaled information are further elaborated with the following examples. First, consider an example where the determined composite dynamic subframes on carrier f2 are subframes #3, #4, #7 and #8. The serving radio network node indicates to the UE that the composite dynamic subframes on carrier are subframes #3, #4, #7 and #8. In another example, the serving radio network node indicates to the UE that the normal subframes (i.e., the subframes which are not composite dynamic subframes) or the subframes whose direction will not change are subframes #0, #1, #2, #5, #6 and #9. The subframes #0 and #5 are always downlink since they contain pre-defined common channels and signals such as PSS/SSS, PBCH, SIB1, etc. That means subframes #0 and #5 are not dynamic subframes. Therefore, in an advantageous approach to reducing the signaling overhead, the network in some embodiments excludes these subframes when signaling the information about subframes that are not dynamic. For example, the serving radio network node indicates that subframes #1, #2, #6 and #9 are non-dynamic subframes in cells on carrier f2.

As for examples of the carriers for which the serving radio network node signals the above information to the UE, such information may be signaled for any one or more of: an intra-frequency TDD carrier, an inter-frequency TDD carrier(s); and inter-RAT LTE TDD carriers, etc., depending upon the RAT of the serving cell. For example if the serving cell is GSM or HSPA, then the serving cell will provide the information about one or more inter-RAT LTE TDD carriers for performing the inter-RAT TDD measurements.

The serving radio network node may signal the above-mentioned information to the UE in low UE activity states or in high UE activity states. Examples of low UE activity states are idle state, CELL_PCH state, URA_PCH state, CELL_FACH state, etc. Examples of high UE activity states are RRC connected state, CELL_DCH state, etc. The network node may signal this information to the UE using higher layer protocols, such as Layer 3 protocol (Radio Resource Control or RRC protocol). In low activity states, the network node may signal the information to the UE on a broadcast channel, e.g., on one or more system information blocks, or SIBs. In high activity states the network may signal the information to the UE on a UE specific channel, e.g., a shared channel such as the Physical Downlink Shared Channel or PDSCH in LTE, or using a shared channel, such as when the serving cell is HSPA, etc.

The network may signal this information to the UE periodically or on a triggered or as-needed basis. For example, the information is signaled whenever the information related to the composite dynamic subframes changes for any TDD carrier of interest. As for triggered signaling, the information can be signaled for specific occasions or events, e.g., before or after cell change, signal quality of serving cell measurement deviates from a threshold by certain margin, etc.

Another aspect of the teachings herein relate to a UE that is configured to receive and use the above-described signaled information. In an example configuration, the UE receives signaling indicating the composite dynamic subframes, and it uses that information for performing one or more radio operational tasks, e.g., one or more radio resource management tasks or actions. Examples operations performed in dependence on the received signaling include one or more of:

selectively performing one or more radio measurements;
using the information internal usage, e.g. for performing cell selection, cell reselection, for collecting measurement statistics, for determining its position;
using the information for external usage, such as for reporting the measurement results to a serving radio network node, for reporting the measurement results to positioning node (e.g. E-SMLC) etc.; and
forwarding the obtained information to other UEs and/or other network nodes.

Thus, the UE may use the received information related to composite dynamic subframes on a TDD carrier to decide which subframes it can use for performing one or more radio measurements. For example, if the UE has detailed information (such as shown in the table of FIG. 7) about the dynamic subframes on a TDD carrier, then it can use specific subframes for performing the radio measurements as shown in the table of FIG. 8.

The UE decision may be implementation-specific to the UE, or it can be based on one or more pre-defined rules. The pre-defined rules may also be expressed implicitly in terms of pre-defined requirements associated with each measurement. For example, the UE has to meet the pre-defined requirements that depend upon the number or percentage of composite dynamic subframes on a TDD carrier. Examples of pre-defined requirements are measurement period, measurement accuracy, measurement reporting delay, signal conditions under which the pre-defined requirements are to be met etc.

The pre-defined rules and/or pre-defined requirements may be applicable for a particular type of measurement (e.g., signal strength such as RSRP), for group of measurements (e.g., mobility related or positioning related such as RSTD) or for all measurements. They can also be different for different types of measurements.

In one example of a predefined rule, the UE follows a rule where the UE shall only use those subframes for performing radio measurements that are not indicated as composite dynamic subframes. According to another example rule, the UE shall only use those subframes for performing radio measurements that are not indicated as composite dynamic subframes and also those composite dynamic subframes for measurements provided their direction is uniquely determined by the UE. For example, in a DL CoMP scenario, the UE may be aware of a direction of each subframe in one or more neighbor cells. Such detection may be based on correlating over reference signals. In another example, the UE blindly detects the direction of a particular dynamic subframe in a cell.

In yet another example, if the network informs the UE that there are composite dynamic subframes on a TDD carrier (e.g., a simple indication without subframe specific information), then for performing radio measurements the UE shall use only those subframes which cannot be dynamic subframes. For example, the UE may only use subframes #0 and #5 to ensure that the measurements are performed on the desired signals.

In another example, the UE may use subframes #0, #1, #2, #5, #6 and #7 and it is aware that TDD configuration with subframes #1 and #6 as a special subframe is used on a TDD carrier. The UE can acquire information about the TDD configuration on a carrier from the serving cell or during initial cell search, or through blind detection.

In yet another specific example, the UE shall perform one or more measurements according to a first or second set of requirements, where the set of requirements that applies depends on whether the UE has received signaling indicating that "composite dynamic subframes" are used on the involved TDD carrier. For example, the UE performs measurements meeting the second set of requirements when it is indicated that composite dynamic subframes are used on the TDD carrier, and otherwise the UE performs the measurements according to the first set of requirements. The second set of requirements may be less stringent or more "relaxed" than the first set of requirements.

For example, the second set of requirements may be characterized by a longer measurement period than is used in first set of requirements. In an example case, the second and the first sets of requirements use 400 ms and 200 ms measurement periods, respectively. In another example, the measurement period may be the same, but another one or more pre-defined requirements can be relaxed. For example, the number of identified cells (e.g., the number of RSRP/RSRQ measurements) required to be measured by the UE is reduced in the second set of requirements. As a working example, the number of identified cells is reduced from 8 cells in the first set of requirements to 6 cells in the second set of requirements, on a particular TDD carrier.

In yet another specific example it may be pre-defined that second set of pre-defined requirements related to measurements done on cells on a TDD carrier shall be met by the UE when the indicated number of "composite dynamic subframes" used on a particular TDD carrier exceeds certain threshold; otherwise the UE shall meet the first set of requirements. The threshold can be 3 subframes per radio frame. The second set of requirements is more relaxed (or less stringent) then the first set of requirements as explained in the previous examples.

In yet another specific example it may be pre-defined that the UE is not required to meet the pre-defined requirements in case the number of "composite dynamic subframes" used on a particular TDD carrier exceeds another threshold, such as four.

In another specific example, it may be pre-defined that the UE is required to meet the second set of pre-defined requirements related to measurements done on cells on a TDD carrier in case the indicated number of "composite dynamic subframes" used on that particular TDD carrier is changed while the UE is performing the measurements.

Also as noted, a UE configured according to the teachings herein may be configured to forward received signaling relating to composite dynamic subframes. For example, a UE capable of device-to-device, D2D, communication may forward the obtained information related to composite dynamic subframes per TDD carrier, or at least a portion of such information, to one or more other D2D-capable UEs. The UE may obtain the information based on receiving it explicitly from a network node, or may obtain it implicitly, e.g., by autonomously determining the dynamic subframes used in different cells on a TDD carrier. For example the UE may autonomously determine the dynamic subframes when performing measurements on cells on a TDD carrier. More specifically the UE performs correlation over known reference signals (e.g., CRS, etc.) in a subframe and observes the difference in results of correlation between different radio frames. If the difference is larger than a threshold (e.g., 6 dB or more) then the UE may assume that the subframe direction has changed between one or more subframes and that the subframe therefore is a dynamic subframe. The UE can store such obtained information for multiple cells and collect statistics. The UE may also use both explicit and implicit information to further verify and confirm the composite dynamic subframes configured in cells on a TDD carrier.

In one example of the forwarding contemplated herein, the D2D UE may signal the other D2D UEs the information related to the dynamic subframes configured in all or on certain cells on a TDD carrier, such as in a serving cell, or on particular neighbor cells, etc. The D2D UE may send this information to other D2D UEs proactively, or based on a request received from the network node, or based on a request received from other D2D UEs, or based on occurrence of an event or fulfillment of one or more conditions, such as when the number of dynamic subframes is changed, etc.

A UE may also forward the obtained information related to "composite dynamic subframes per TDD carrier" or at least a portion of such information to one or more network nodes, e.g. positioning node, etc. For example, the UE may signal a positioning node (e.g. a E-SMLC over LPP) the information related to dynamic subframes configured in all or on certain cells on a TDD carrier, such as for a serving cell, or on particular neighbor cells, etc. The positioning node may use this information for one or more positioning related operations or tasks.

If there is a large number of dynamic subframes (e.g. 4 or more) on a TDD carrier, for example, then the positioning node may configure the UE to perform one or more positioning measurements over a larger bandwidth (e.g. over 10 MHz or larger). In another example, if there is large number of dynamic subframes (e.g. 4 or more) on a TDD carrier, then the positioning node may select a positioning method having requirements involving signals received and/or transmitted between the UE and the serving cells. For example the positioning node may use E-CID, requiring UE and/or eNode B Rx-Tx time difference measurements, UTDOA requiring UL RTOA measurement, etc.

In yet another example, the positioning node may further signal the received information related to the dynamic subframes or part of it to one or more measuring radio nodes (e.g. LMU), which perform positioning measurements on signals transmitted by the UE. The measuring node may use this information when performing one or more positioning measurements e.g. UL RTOA on UE transmitted signals. For example the measuring node selectively avoids performing measurements on signals on 'dynamic subframes' of the serving cell of the UE. This ensures that the positioning measurements are performed accurately and therefore the positioning accuracy is not degraded.

In yet another example, if the UE autonomously obtains the information about the dynamic subframes on a TDD carrier, then the UE may also signal this information to its serving radio network node (e.g. serving eNode B, serving Radio Network Controller, serving Base Station Controller, etc.). The serving radio network node can signal this information as part of the measurement configuration to other UEs being served by it. The serving radio network node may also update its own list of "composite dynamic subframes" on a TDD carrier.

All UEs may not be capable of using CDS information. Accordingly, it is contemplated herein to have a UE configured to signal its capability to the network node with regard to receiving/using CDS information, where such information can be taken into account by the serving network node, a core network node, a positioning node, etc., e.g., for selectively performing one or more tasks performing radio measurements etc. The UE may also indicate the number of TDD carriers on which the UE can apply the CDS information for performing measurements. The UE may also indicate the type of measurements, e.g. mobility related such as RSRP/RSRQ, etc., for which the UE can apply the CDS information when performing radio measurements. In other words, the UE may indicate the particular manner and/or limits that apply to the UE, with respect to using CDS information signaled from the network, for performing radio measurements on one or more TDD carriers 22 having dynamic subframes.

The network node (e.g. serving eNode B, serving RNC etc) may use the received UE capability information when performing one or more tasks. For example if the UE does not support even a base capability, then the network node may configure the UE to perform measurements only on those TDD carriers on which either no dynamic subframe is configured or where the number of composite dynamic subframes is below a threshold e.g., 3. Thus, a network node may modify, configure, or otherwise control the measurements performed by a non-capable UE to avoid or reduce measurement problems that might otherwise arise from the presence of dynamic subframes.

The UE may send its capability information to the network node in any of the following manner:
  proactive reporting without receiving any explicit request from the network node (e.g. serving or any target network node); and
  reporting upon receiving any explicit request from the network node (e.g. serving or any target network node)

The explicit request can be sent to the UE by the network anytime or at any specific occasion. For example the request for the capability reporting can be sent to the UE during initial setup or after a cell change (e.g. handover, RRC connection re-establishment, RRC connection release with redirection, PCell change in CA, PCC change in PCC etc.).

In turn, it is contemplated herein that a network node in a wireless communication network implements a method of using capability information received from a UE, where that capability information indicates the UE's ability to receive/use information signaled by the network about composite dynamic subframes (e.g., on a per carrier basis) for measurement control.

Of course, as described earlier herein, the network node may also use the determined information related to the composite dynamic subframes per TDD carrier for performing one or more measurement control related tasks. In one example the network node (e.g., an aggressor eNB in a heterogeneous network arrangement) configures one or more transmit signal patterns (e.g. ABS pattern), which take into account the information related to the composite dynamic subframes per carrier. For example the network node may exclude all the determined composite dynamic subframes configured on a TDD carrier when configuring the ABS pattern; e.g., all ABS subframes in a pattern are not dynamic subframes. The network node may also inform other network nodes (e.g. low power nodes, victim pico eNBs, etc.) that the transmit signal patterns (e.g. ABS pattern) have been configured while taking into account the information related to the composite dynamic subframes. In an example of this consideration, the ABS subframes are not dynamic subframes or do not overlap with any dynamic subframe on the TDD carrier.

In another example, the network node, such as an eNB in a heterogeneous network, may configure UE with one or more measurement patterns that take into account the information related to the composite dynamic subframes per TDD carrier. Example measurement patterns include resource restriction measurement patterns, which are also referred to as restricted patterns, as well as CSI measurement patterns, etc.

In at least one embodiment of such operation, the network node excludes all the determined composite dynamic subframes configured on a TDD carrier when configuring one or more measurement patterns, so that no restricted measurement subframes in a pattern are dynamic subframes. The network node may also inform other network nodes (e.g. high power nodes such as aggressor eNBs) that the measurement patterns have been configured while taking into account the information related to the composite dynamic subframes, e.g., that restricted measurement subframes are not dynamic subframes or do not overlap with any dynamic subframe on the TDD carrier. The network node may signal the adapted one or more measurement patterns to the UE, for performing one or more measurements, such as CSI, RSRP, RSRQ, UE Rx-Tx time difference measurements, etc.

In another example the network node (e.g. eNode B, RNC etc.) may decide whether to configure a UE to perform certain radio measurements while taking into account the information related to the determined composite dynamic subframes per TDD carrier. For example if the number of dynamic subframes per carrier is larger than a threshold (e.g. 3 or more) on a particular non-serving TDD carrier then the network node may not include this carrier in measurement configuration sent to the UE for performing the radio measurements. This is because the cells on the non-serving TDD carrier (e.g. inter-frequency, inter-RAT carrier) are typically measured by the UE in measurement gaps, which may not overlap all measurable subframes if there are several dynamic subframes (i.e. non measurable subframes).

In another example, if the number of dynamic subframes per carrier is larger than a threshold, then the network node may include this carrier in the measurement configuration sent to the UE for performing the radio measurements, provided the UE is capable of measuring on non-serving TDD carrier frequency without measurement gaps.

In yet another example, if the number of dynamic subframes per carrier is larger than a threshold, then the network node may configure the UE to perform measurements over a larger measurement bandwidth (BW), e.g., over a BW of 10 MHz or larger. It is recognized herein that there is a tradeoff between available time and measurement bandwidth and, therefore, that a larger measurement BW enables the UE to achieve better radio measurement performance (e.g. better measurement accuracy) in cases where fewer subframes are available for measurement on a TDD carrier, due to larger number of dynamic subframes on the TDD carrier.

In addition to, or as an alternative to the network node using the composite dynamic subframe information determined by it, the network node in one or more embodiments is configured to forward such information to one or more other nodes in the network. Examples of other network nodes are any other network node, a core network node (e.g. MSC, MME etc.), O&M, OSS, or SON nodes, a positioning node (e.g. E-SMLC), MDT node, etc. Examples of network nodes are base stations, including NodeBs, eNBs, etc., network controllers, radio network controllers, base station controllers, relays, donor nodes controlling relays, base transceiver stations, BTSs, access points, APs, etc.

As for contemplated mechanism of signaling the composite dynamic subframe information to other network nodes, non-limiting examples include the network node forwards such information in any of the following manners:
 proactive reporting without receiving any explicit request from another network node (e.g. neighboring or any target network node); and
 reporting upon receiving any explicit request from another network node (e.g. neighboring or any target network node).

The explicit request can be sent to the network node by another network any time or at any specific occasion. For example the request for the information can be sent to the network node during initial setup, when the network node is upgraded (e.g. more radio unit or transceivers, number of antennas in a radio unit are increased, new antennas modes are deployed, the TDD configuration is changed, etc.).

The other network node may use the received information for performing one or more radio operational tasks. Examples of such tasks are using the received information when configuring the UE to perform or more measurements, forwarding information to a measuring node, for network planning, tuning or setting of radio network parameters, etc.

In one example, a network node, such as an eNB, forwards the determined information to neighboring eNBs over the X2 interface. A receiving eNB includes this information, or at least a portion of it, in a measurement configuration message sent to its own UEs, for performing the radio measurements on neighbor cells. In this way, the receiving eNB does not have to determine the dynamic subframes on all the TDD carriers. That is, when a given eNB or other network node determines the composite dynamic subframes for one or more TDD carriers, the information may be obtained at least in part from signaling received from neighboring nodes/cells, indicating the dynamic subframes in use in those neighboring cells, e.g., on a per TDD carrier basis.

In another example, a network node forwards the determined information to a network node performing or involved in network planning and/or tuning of radio network parameters. Such nodes are SON, O&M, and/or OSS nodes, for example. If the average or overall number dynamic subframes per radio frame on a TDD carrier is above a threshold (e.g. 4 or more) then the receiving node may recommend that the network nodes reduce the number of dynamic subframes, e.g. no more than two or three per radio frame. In another example the network node may configure the network nodes with larger bandwidth, to compensate for performance degradation of radio measurements due to fewer subframes available for measurements.

In yet another example, a network node forwards the composite dynamic subframe information to a positioning node (e.g. E-SMLC via LPPa). The positioning node in one or more embodiments contemplated herein uses the received information for one or more positioning related tasks, as described earlier herein. Also as described earlier herein, the positioning node may obtain composite dynamic subframe information for one or more TDD carriers, as used in any number of cells, from one or more UEs operating in one or more of those cells.

More broadly, the teachings herein disclose a method and apparatus whereby a network node determines the dynamic subframes in use in one or more cells, for one or more TDD carriers. The information identifying the overall set of dynamic subframes used for a given TDD carrier in a number of cells, e.g., a number of neighboring cells, is referred to as "composite dynamic subframe information."

Further according to the teachings herein, the network node in one or more embodiments is configured to adapt, configure or otherwise control one or more radio signal measurements made by a UE or UEs, based on the determined composite dynamic subframe information. Additionally, or alternatively, the network node transmits signaling to the UE(s), to indicate the determined composite dynamic subframe information, or at least a portion thereof. In turn, the UE(s) are configured to take such information into account when configuring one or more radio signal measurements made by them. For example, a UE may avoid making measurements on dynamic subframes, or otherwise adjust one or more measurement requirements or parameters, to account for the presence of dynamic subframes.

Thus, the disclosed methods enable a network node to determine the dynamic subframes used in cells on a TDD carrier, and further enable a network node to provide information related to the dynamic subframes used in cells on a TDD carrier, to the UEs under its control. Such operations insure that the UEs perform reliable measurements in communication networks that use dynamic TDD. For example, configuring RSRP and/or RSRQ (or other mobility-related) measurements to take the dynamic subframe information into account improves mobility-related performance in the network. The teachings herein also enhance positioning accuracy and performance by improving positioning related measurements, e.g., RSTD, UL RTOA, etc., by taking dynamic subframe information into account.

Figure 9:
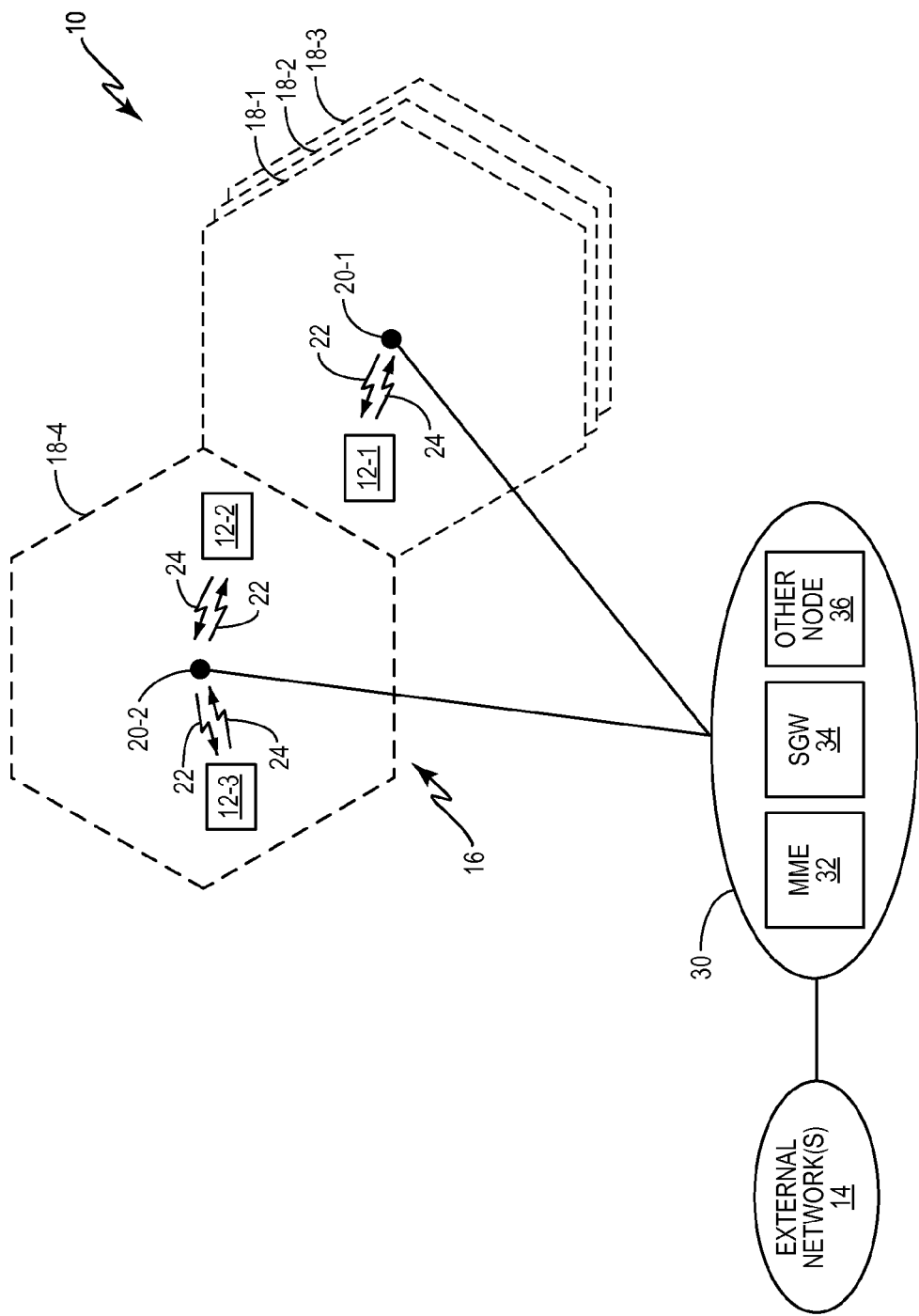
FIG. 9 is a block diagram of one embodiment of a wireless communication network, which includes one or more radio network nodes and one or more wireless devices configured according to the teachings herein.

With these example advantages in mind, FIG. 9 illustrates a wireless communication network 10, such as cellular network based on the LTE specifications. The network 10 communicatively couples one or more wireless devices 12, e.g., 12-1, 12-2, and 12-3, to one or more external networks 14, such as the Internet. Here, the device(s) 12 may be understood as examples of the UE and UE-functionality described above.

The network 10 includes a Radio Access Network, RAN 16. The RAN 16 provides communication services over a corresponding geographic region or area by way of cells 18, where a number of base stations 20, e.g., 20-1 and 20-2, provide these cells 18. In an LTE embodiment, the base stations 20 are eNBs and they may be interconnected, e.g., via X2 interfaces in such embodiments.

A cell 18 may be understood as the allocation of particular air interface resources within or for a particular coverage area or location. For example, each cell 18 provides a downlink TDD carrier 22 operating on a particular carrier frequency, and wireless devices 12 correspondingly transmit uplink signals 24 to their "serving" base stations 20 in the network. Any given base station 20 may provide multiple cells 18 by transmitting on more than one carrier frequency, where such cells may partly or wholly overlap. FIG. 9 illustrates an example of this arrangement, where the base station 20-1 provides cells 18-1, 18-2, and 18-3, while the base station 20-2 provides the cell 18-4. Notably, the cell 18-4 may use the same carrier frequency as any of cells 18-1, 18-2 and 18-3.

Figure 10:
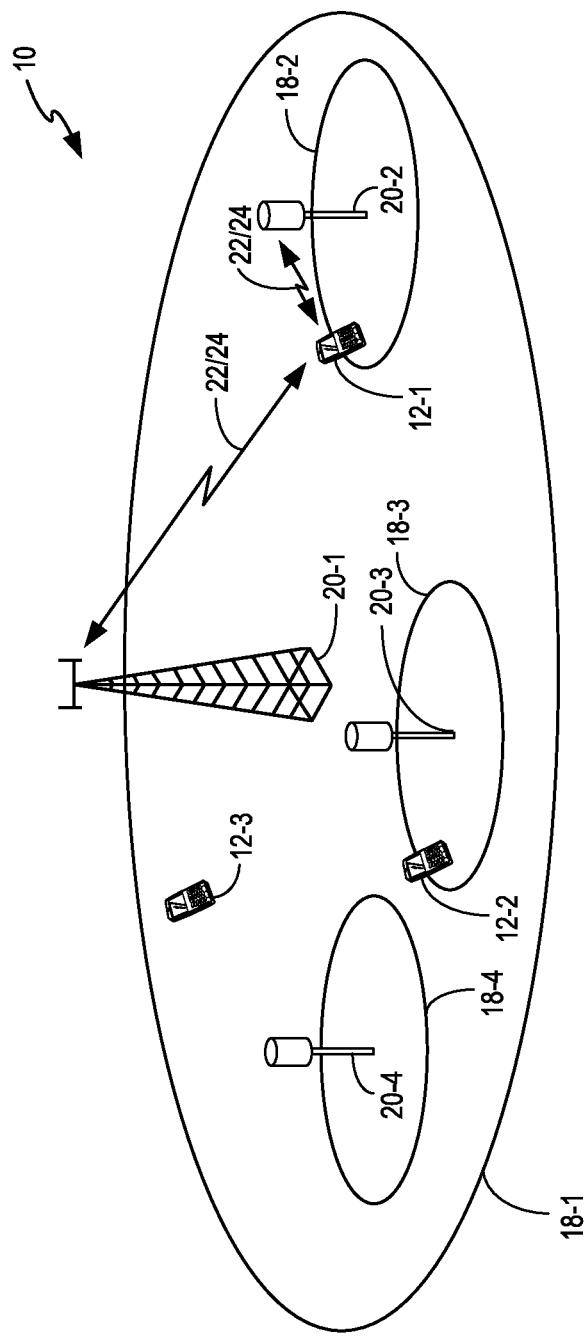
FIG. 10 is a block diagram of another embodiment of a wireless communication network, which includes one or more radio network nodes and one or more wireless devices configured according to the teachings herein.

Of course, the teachings herein are not limited to the example cell arrangement depicted in FIG. 9. Consider FIG. 10, for example, which shows another network arrangement in which the teachings herein are applicable. In particular, FIG. 10 illustrates a heterogeneous network arrangement in which the base station 20-1 is depicted as a macro base station and where the cell 18-1 is depicted as a corresponding macro cell. In turn, the base stations 20-2, 20-3 and 20-4 are depicted as pico base stations, where the base station 20-2 provides the cell 18-2 as a pico cell overlaid on the macro cell 18-1, the base station 20-3 provides the cell 18-3 as a pico cell overlaid on the macro cell 18-1, and the base station 20-4 provides the cell 18-4 as a pico cell overlaid on the macro cell 18-1.

Turning back to FIG. 9 for a moment, the network 10 further includes a Core Network, CN 30, which by way of example includes a Mobility Management Entity, MME 32, a Serving Gateway, SGW 34, and one or more other nodes 36, such as positioning nodes, OOM nodes, etc. In some embodiments, one or more of the base stations 20 as network nodes configured according to the teachings herein. Additionally, or alternatively, there may be one or more other network nodes so configured, such as a Radio Network Controller, RNC, which is not shown in FIG. 9 but which may be present in the network 10 depending on the type of the network 10. Other network node examples include one or more CN nodes, such as a positioning node, which are configured according to the network-side teachings herein.

Figure 11:
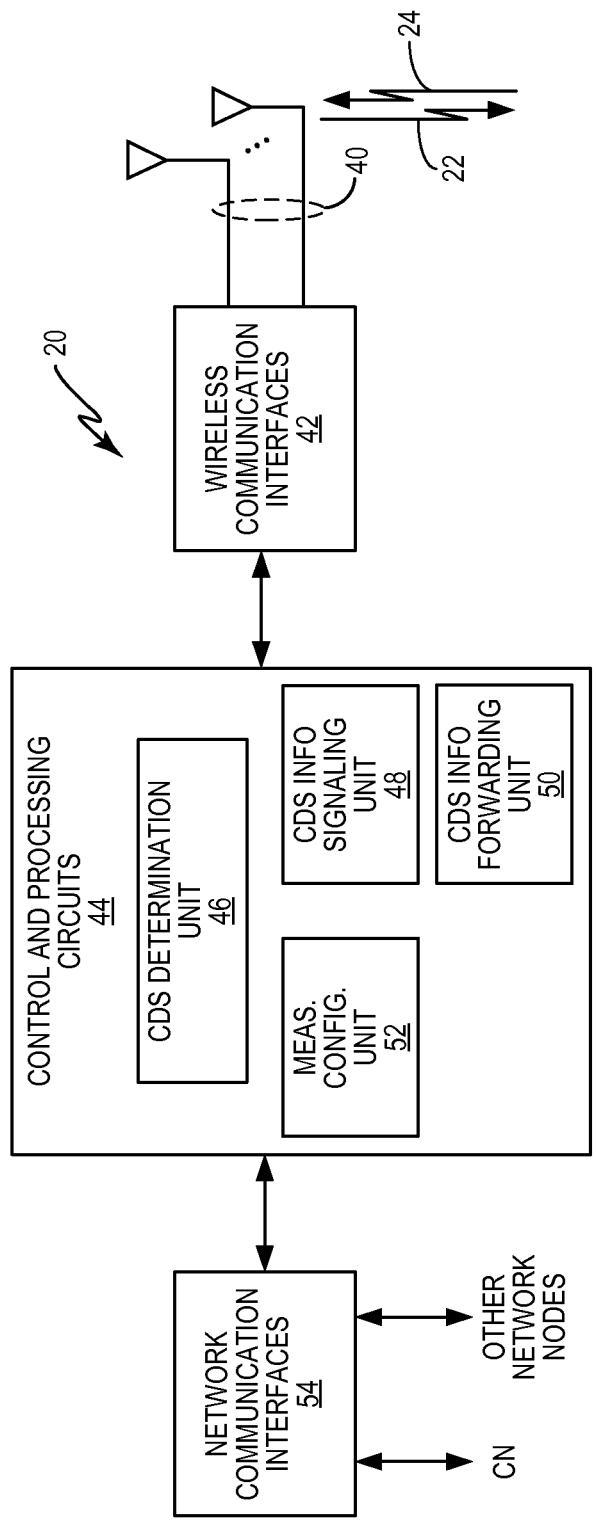
FIG. 11 is a block diagram of one embodiment of a radio network node configured according to the teachings herein.

FIG. 11 illustrates one embodiment of a base station 20, as an example of a network node configured according to the teachings herein. It will be appreciated that another network node, such as a CN node may not have the same type or number of communication interfaces, but will have processing circuitry configurable in the manner described for the base station 20 in the context of FIG. 11.

The illustrated base station 20 includes one or more receive/transmit antennas 40 associated with a wireless communication interface 42. In an example, the wireless communication interface 42 comprises radio receiver circuitry and radio transmission circuitry configured for transmitting one or downlink carriers 22 and for receiving uplink signals 24 from any number of wireless devices 12. The wireless communication interface 42 is operatively associated with control and processing circuits 44, which are referred to herein as a processing circuit 44. The processing circuit 44 may comprise one or more microcontrollers, DSPs, FPGAs, ASICs, or other digital processing circuitry, such as computer processing circuitry that is specially adapted to perform the network-side teachings herein based on the execution of computer programs stored in a computer readable medium in or accessible to the processing circuit 44.

In at least one embodiment, the processing circuit 44 at least functionally includes a number of circuits which are referred to in the diagram as "units," but which should be understood as circuit modules or arrangements, e.g., configured programmatically within one or more digital processors. These units include a CDS information determination unit 46 that is configured to determine CDS information as taught herein, a CDS information signaling unit 48 that is configured to send the CDS information, e.g., to a targeted wireless device 12 via the wireless communication interface 42, a CDS information forwarding unit 50, which is optionally included and which is configured to forward the CDS information or information derived therefrom to one or more other nodes, e.g., other base stations 20. The processing circuit 44 in some embodiments also includes a measurement configuration unit 52, which is configured to adapt a measurement configuration to account for dynamic subframes as are known from the CDS information.

Such adaptation may be performed at the base station 20 with respect to wireless devices that are not capable of making measurement configuration adaptations with respect to CDS information. In this regard, it will be understood that the base station 20 may determine CDS information with respect to multiple carrier frequencies and with respect to specific cells 18 and/or specific groups of cells 18. In other words, given CDS information is specific to a given carrier frequency and given cells 18 providing TDD carriers 22 on that frequency, and the base station 20 may determine different CDS information for TDD carriers 22 and/or groups of TDD carriers on given carrier frequencies. The depicted base station 20 further includes a network communication interface 54, for receiving CDS information from other network nodes, and/or for sending CDS information to other network nodes.

With the above in mind, the example base station 20 represents a network node that is configured for operation in the network 10 and which includes a communication interface 42 configured for sending signaling to and receiving signaling from one or more wireless devices 12 served by the network node 20. The network node further includes a processing circuit 44 operatively associated with the communication interface 42. The processing circuit 44 is configured to determine CDS information, for a TDD carrier frequency used by one or more TDD carriers 22 transmitted by a respective one or more cells 18 in the network, and to send the CDS information to a wireless device 12, for use by the wireless device 12 in performing radio measurements with respect to the one or more TDD carriers 22. As noted previously, the CDS information indicates that one or more subframes in one or more of the TDD carriers 22 are dynamic subframes having a dynamically changeable uplink or downlink direction.

The processing circuit 44 sends the CDS information as obtained or generated by the base station 20, subject to any formatting, encoding, packaging, encapsulating, or otherwise adapting needed for signaling the CDS information to a wireless device 12 via the wireless communication interface 42. Alternatively, the CDS information as sent to the wireless device 12 may be a subset of a larger or richer set of CDS information obtained or generated by the base station 20, or may be derived from such information.

Figure 12:
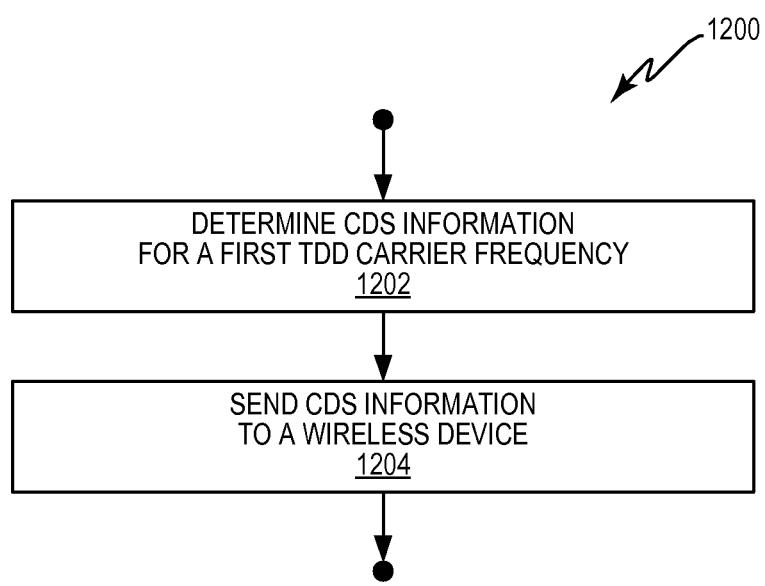
FIG. 12 is a logic flow diagram of one embodiment of a network-side method of processing at radio network node, according to the teachings herein.

FIG. 12 illustrates a method of network-side processing as contemplated herein for a network node, such as a serving base station or other radio network node. The method 1200 includes determining (Block 1202) CDS information, for a first TDD carrier frequency used by one or more TDD carriers 22 transmitted by a respective one or more cells 18 in the network 10. The CDS information indicates that one or more subframes in one or more of the TDD carriers 22 are dynamic subframes having a dynamically changeable uplink or downlink direction, and the method 1200 further includes sending (Block 1204) the CDS information to a wireless device 12 operating in the network 10, for use by the wireless device 12 in performing radio measurements with respect to the one or more TDD carriers 22. For example, the device 12 uses the CDS information to identify the dynamic subframes and to avoid making measurements with respect to the one or more TDD carriers 22 at times corresponding to the dynamic subframes, or to make a greater number of measurements than it nominally would on the one or more TDD carriers 22, and/or to extend the measurement interval(s) it would nominally use for making measurements on the one or more TDD subcarriers 22.

In some embodiments, the CDS information comprises one or more logical flags that indicate to the wireless device 12 the presence of the dynamic subframes in the one or more TDD carriers 22. In other embodiments, the CDS information comprises all or part of a potentially larger or richer set of CDS information as generated or obtained by the network node, subject to any adaptations needed for signaling.

In an example case, the one or more cells 18 include a serving cell 18 with respect to the wireless device 12 and one or more neighboring cells 18 of the serving cell 18. The CDS information indicates to the wireless device 12 which subframes in the TDD carriers 22 that are transmitted by the serving cell 18 and the one or more neighboring cells 18 are dynamic subframes. That is, the CDS information may identify, either explicitly or implicitly, which subframe(s) in each TDD carrier 22 are dynamic subframes.

In another example case, the first TDD carrier frequency is a non-serving carrier frequency with respect to the wireless device 12 and the one or more TDD carriers 22 are one or more neighboring-cell carriers 22 with respect to a serving-cell carrier 22 transmitted by a serving cell 18 of the wireless device 12. The CDS information indicates, for example, which subframes on the non-serving carrier frequency in the one or more neighboring-cell carriers 22 are dynamic subframes.

As for sending the CDS information, in some embodiments, sending (Block 1204) the CDS information to the wireless device 12 comprises sending Radio Resource Control, RRC, signaling to the wireless device 12. Further, in at least some embodiments, the step of sending (Block 1204) the CDS information to the wireless device 12 is predicated on first receiving capability information for the wireless device 12, indicating that the wireless device 12 is capable of performing radio measurements to account for dynamic subframes. Put simply, the base station 20 or other network node may send CDS information only to those wireless devices 12 which have been identified as being capable of accounting for dynamic subframes in their downlink carrier measurements.

Thus, in some embodiments, the method 1200 further includes, for a second wireless device that is not indicated as being capable of performing radio measurements to account for dynamic subframes, adapting a radio measurement configuration of the second wireless device with respect to the one or more TDD carriers 22, to account for the dynamic subframes in those one or more TDD carriers 22. Here, the method 1200 includes sending corresponding measurement configuration information to the second wireless device.

Thus, for a wireless device 12 that is capable of using CDS information to perform radio measurements that account for dynamic subframes, it is sufficient to send the CDS information to the device 12, to enable the device 12 to make the appropriate adaptations to its radio measurements. The nominal configuration used by the device 12 for making those measurements may be set by the network 10, such that the device 12 alters, adjusts or otherwise adapts the measurements it would otherwise make according to the configuration, to account for the presence of the dynamic subframes in the one or more TDD carriers 22.

Conversely, for a wireless device that is not capable of parsing or using CDS information, the network node makes the appropriate measurement configuration adaptations and sends corresponding measurement configuration information to the device. Equivalently, the network node signals one or more parameters underlying the adaptations that should be made, and the device 12 makes the adaptations based on the signaled parameters.

As for example details regarding CDS information sent to a wireless device 12, in some embodiments the CDS information as sent comprises any one or more of: an indication as to which subframes are dynamic subframes, an indication as to which subframes are not dynamic subframes, and an indication for a case where the one or more TDD carriers 22 comprise a serving cell carrier 22 for the wireless device 12 and one or more neighboring-cell carriers 22, and/or an indication as to whether the dynamic subframes are the same as between the serving-cell carrier 22 and the one or more neighboring-cell carriers 22.

In another example case, the one or more TDD carriers 22 on the first TDD carrier frequency comprise a first TDD carrier 22 configured as a first serving-cell carrier 22 for the wireless device 22 according to a Carrier Aggregation, CA, configuration of the wireless device 12. The CA configuration further configures a second serving-cell carrier 22 for the wireless device 12 on a second TDD carrier frequency, and the method 1200 further includes determining second CDS information with respect to the second TDD carrier frequency and sending the second CDS information to the wireless device 12. In general, it will be appreciated that the network node may be configured to determine and send CDS information to a given wireless device 12 for any number of TDD carrier frequencies that are of interest with respect to that device 12, e.g., in terms of any one or more of CA operation, neighboring cells 18, serving cells 18, etc.

In some embodiments, determining (Block 1202) the CDS information comprises the network node identifying which subframes in the one or more TDD carriers 22 are dynamic subframes, according to information received from one or more other nodes in the network 10. These other nodes may be other base stations 20 and/or other nodes 36 in the CN 30, such as positioning nodes.

Further, in some embodiments, determining (Block 1202) the CDS information includes adapting or otherwise filtering the CDS information so that the CDS information only indicates those dynamic subframes meeting one or more defined conditions. For example, the one or more defined conditions comprise one or more of: those dynamic subframes having uplink/downlink directional changes of a defined frequency threshold or range; and those dynamic subframes conveyed in any of the one or more TDD carriers 22 that meet a defined signal quality threshold or range at the wireless device 12.

Figure 13:
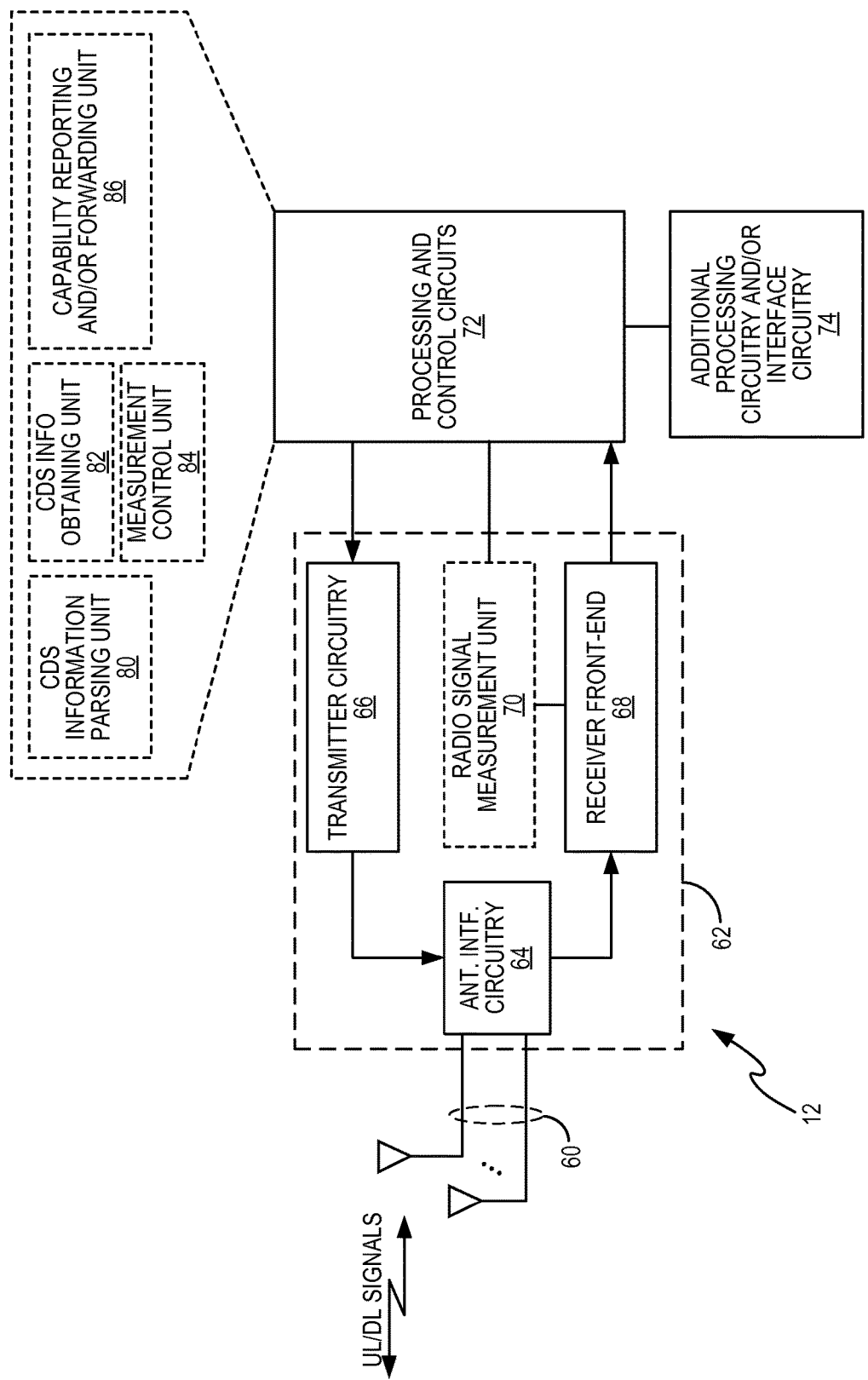
FIG. 13 is a block diagram of one embodiment of a wireless device configured according to the teachings herein.

As, for example, wireless device details, FIG. 13 illustrates a non-limiting embodiment. The illustrated wireless device 12 comprises one or more receive/transmit antennas 60, a transceiver 62, which includes antenna interface circuitry 64, transmitter circuitry 66, a receiver front-end 68, and may include a radio signal measurement unit 70. The transceiver 62 comprises, for example, a radio transceiver configured for operation in a wireless communication network 10, e.g., an LTE network. The device 12 further comprises control and processing circuits 72, which are referred to herein as a "processing circuit 72." The device 12 depending on its intended use and implemented features may include additional processing circuitry and/or interface circuitry 74, such as user interface circuitry, application processors, etc.

The processing circuit 72 in some embodiments comprises one or more microcontrollers, DSPs, ASICs, FPGAs, or other digital processing circuitry. In at least one embodiment, the processing circuit 72 is specially adapted at least in part to implement the device-side teachings herein based on the execution of computer program instructions stored in a computer readable medium in or accessible to the processing circuit 72. In an example, the processing circuit 72 includes one or more physical or at least functional circuits, which are referred to for clarity as "units." In the illustrated example, these units include an optional CDS information parsing unit 80 that is configured to parse received CDS information, a CDS information obtaining unit 82, which is configured to obtain CDS information, either autonomously based on TDD carrier measurements made by the device 12, or based on parsed information provided by the optional CDS information parsing unit 80. With respect to autonomous determination of CDS information, the device 12 may make measurements on TDD carriers 22 and perform correlation processing on those measurements to detect the subframe(s) that are dynamic.

In some embodiments, the network 10 signals CDS information and the CDS information parsing unit 80 processes such signaling. In other embodiments, the network 10 does not send CDS information, and device 12 determines that information autonomously. The device 12 also optionally includes a capability reporting and/or forwarding unit 86, which is configured to report capability information to the network 10 and/or to forward CDS information to another node, such as another device 12 via D2D communications. Note that, as explained earlier, the capability information reported by the device 12 enables the network 10 to recognize that the device 12 is capable of performing radio measurements made on one or more TDD carriers 22, to account for the presence of dynamic subframes in those one or more TDD carriers 22.

Thus, in an example case, a wireless device 12 is configured for operation in a wireless communication network 10 and includes a transceiver 62 that is configured to send signals to and receive signals from the network 10, and includes a processing circuit 72 that is operatively associated with the transceiver 62. The processing circuit 72 is configured to obtain CDS information, for a first TDD carrier frequency used by one or more TDD carriers 22 transmitted by a respective one or more cells 18 in the network 10, and to perform radio measurements with respect to the one or more TDD carriers 22 according to the CDS information.

Figure 14:
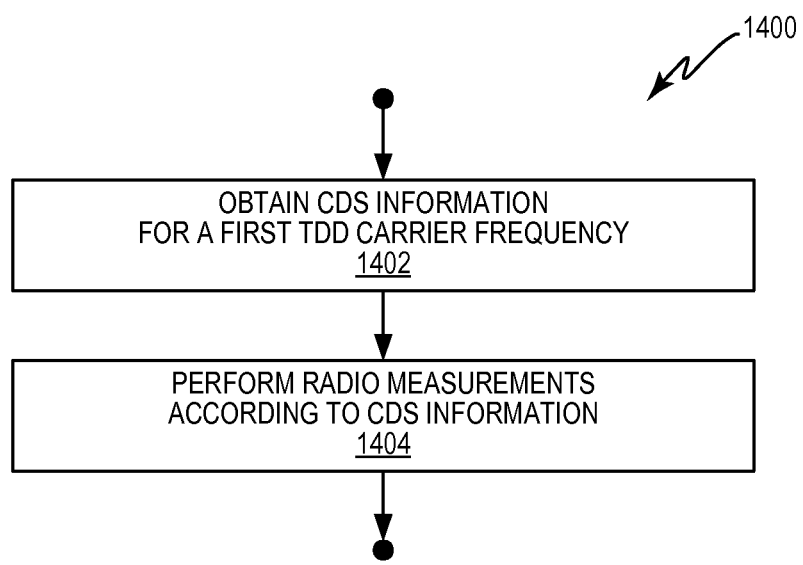
FIG. 14 is a logic flow diagram of one embodiment of a device-side method of processing at wireless device, according to the teachings herein.

FIG. 14 illustrates a method 1400 that is implemented at an example device 12, e.g., via programmatic configuration. The method 1400 includes obtaining (Block 1402) CDS information for a first TDD, carrier frequency used by one or more TDD carriers 22 transmitted by a respective one or more cells 18 in the network 10, and further includes performing (Block 1402) radio measurements with respect to the one or more TDD carriers 22 according to the CDS information.

In some embodiments, the CDS information comprises one or more logical flags indicating the presence of the dynamic subframes in the one or more TDD carriers 22. Such information may be received from a network node in the network 10, or may be generated by the device 12, based on performing radio measurements and correlation processing on the one or more TDD carriers 22. The CDS information in at least some embodiments explicitly or implicitly identifies which subframes in which ones of the one or more TDD carriers 22 are dynamic subframes.

In an example case, the one or more cells 18 include a serving cell 18 with respect to the wireless device 12 and one or more neighboring cells 18 of the serving cell 18. The CDS information here indicates which subframes in the TDD carriers 22 transmitted by the serving cell 18 and by the one or more neighboring cells 18 are dynamic subframes. In a particular example, the CDS information for this case comprises an indication that the serving-cell and neighboring-cell carriers 22 have the same dynamic subframes. Such an arrangement is advantageous because one bit or very few bits can be used to indicate that the dynamic subframes in the neighboring cells 18 are the same—i.e., the same subframe number(s)—as used in the serving cell 18.

In another example case, the first TDD carrier frequency is a non-serving carrier frequency with respect to the wireless device 12 and the one or more TDD carriers 22 are one or more neighboring-cell carriers 22 with respect to a serving-cell carrier 22 transmitted by a serving cell 18 of the wireless device 12. Here, the CDS information indicates which subframes on the non-serving carrier frequency in the one or more neighboring-cell carriers 22 are dynamic subframes.

As for the step of performing radio measurements with respect to the one or more TDD carriers 22 according to the CDS information, in one example, the wireless device 12 adapts the radio measurements it makes on the one or more TDD carriers 22, e.g., to avoid making radio measurements on any of the one or more TDD carriers 22 at times corresponding to the dynamic subframes, or to make a greater number of measurements on the one or more TDD carriers 22 than it otherwise would make, or to extend the measurement interval(s) that it otherwise would use for making measurements on the one or more TDD carriers 22.

In these latter example adaptations, note that using more measurements and/or extending the measurement interval(s) can be understood as attenuating the effect of the dynamic subframes on such measurements. That is, if such measurements are based on the premise that downlink signals are being measured, then measuring on a dynamic subframe that is being used in the uplink direction may produce anomalous or outlier measurements which can be masked or attenuated by making more measurements.

In an example case, the device 12 has a measurement configuration that configures its measurements with respect to the one or more TDD carriers 22 in a default sense, e.g., as sent to it by the network 10. The device 12 may adapt this configuration in consideration of the CDS information, so that the measurements its makes with respect to the one or more TDD carriers 22 are performed in a manner that accounts for the presence of dynamic subframes. Broadly, the device 12 makes one or more adaptations that can be understood as avoiding or compensating for errors or deviations in signal measurements that would otherwise arise from making downlink-oriented measurements on TDD carriers 22 during dynamic subframes that are being used for uplink transmissions.

As noted, such processing may be done at the wireless device 12 for more than one TDD carrier frequency, i.e., for one or more first TDD carriers 22 associated with a first TDD carrier frequency and for one or more second TDD carriers 22 associated with a second TDD carrier frequency. Such circumstances apply, for example, when a CA configuration of the device 12 involves more than one TDD carrier frequency. The CDS information may be different for different TDD carrier frequencies and for different cell(s) 18.

References of further interest with respect to the teachings herein include: 3GPP TS36.211, Table 4.2-2, 3GPP TR 36.828 V2.0.0 (2012-06), RP-12772, "Further Enhancements to LTE TDD for DL-UL Interference Management and Traffic Adaptation", WID approved at 3GPP RAN#58, and Erik Eriksson et al., "Dynamic Uplink-Downlink Configurations and Interference Managements in TD-LTE", IEEE Communications Magazine Vol. 50 No. 11, November 2012.

Also, note that although this document uses terminology from 3GPP LTE, such usage does not limit the scope of the teachings herein to 3GPP LTE. Other wireless systems, including UTR TDD, WiMax, and UMB (or any other system that runs on dynamic/flexible TDD), inter-RAT E-UTRA TDD may also benefit from exploiting the ideas covered within this disclosure.

Further, the term network node as used herein can denote essentially any type of network node or network element. Broadly, terminology such as base station or network node in general should be considering non-limiting and in particular does not imply a certain hierarchical relation between the two. A "base station" could be considered as serving radio node and other base station(s) could be considered as target radio node(s), and these two devices communicate/interfere with each other over certain radio channel.

Depending upon the embodiments even a more general term "network node" is used and it can correspond to any type of network node. Examples of network nodes are any radio network node, core network nodes—e.g. MSC, MME etc., or other node type, such as O&M, OSS, SON, MDT, positioning node, such as an E-SMLC, etc.

Similarly in the embodiments the term user equipment or UE as used herein should also be considered non-limiting. These terms denote essentially any type of wireless communication device that communicates with a radio network node. A UE or other wireless device as contemplated herein may be target device and/or may have Device-to-Device, D2D, communication capabilities, allowing it to communicate with other UEs. In other examples, the wireless device comprises a Machine-to-Machine, M2M, device. In still other examples, the wireless device comprises a cellular telephone, such as a smartphone or other mobile terminal, a laptop computer, a tablet computer, a network communication adaptor, such as a wireless modem, dongle, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a network node in a wireless communication network, for facilitating radio measurements by a wireless device with respect to one or more time-division-duplex (TDD) carriers, the method comprising:
    obtaining cell-specific dynamic subframe (DS) information, for each cell of a plurality of cells, relating to one or more TDD carriers used by each cell, wherein:
        each TDD carrier comprises a plurality of subframes;
        the cell-specific DS information relating to each TDD carrier indicates whether at least a portion of the plurality of subframes have a dynamically changeable uplink or downlink direction; and
        at least two of the plurality of cells use respective TDD carriers having a first common carrier frequency;
    determining, based on the cell-specific DS information, composite dynamic subframe (CDS) information for at least the first common carrier frequency, wherein:
        the CDS information indicates that one or more subframes, comprising the TDD carriers having the first common carrier frequency, are dynamic subframes having a dynamically changeable uplink or downlink direction; and
        the CDS information does not associate the indicated dynamic subframes with any particular cell of the at least two of the plurality of cells; and
    sending the CDS information to the wireless device to facilitate one or more measurements of the wireless device at the first common carrier frequency.

2. The method of claim 1, wherein the CDS information comprises one or more logical flags that indicate to the wireless device the presence of the dynamic subframes in the respective TDD carriers having the first common carrier frequency.

3. The method of claim 1, wherein the CDS information comprises a CDS information message that identifies which subframes, comprising the respective TDD carriers having a first common carrier frequency, are dynamic subframes.

4. The method of claim 1, wherein the at least two of the plurality of cells include a serving cell with respect to the wireless device and one or more neighboring cells of the serving cell.

5. The method of claim 1, wherein the first common carrier frequency is a non-serving carrier frequency with respect to the wireless device and the at least two of the plurality of TDD carriers are neighboring-cell carriers with respect to serving cell of the wireless device.

6. The method of claim 1, wherein sending the CDS information to the wireless device comprises sending Radio Resource Control (RRC) signaling to the wireless device.

7. The method of claim 1, further comprising predicating at least said step of sending the CDS information to the wireless device on first receiving capability information for the wireless device that indicates that the wireless device is capable of performing radio measurements to account for dynamic subframes.

8. The method of claim 7, further comprising, in response to receiving an indication that a second wireless device is not capable of accounting for CDS information when making measurements, sending to the second wireless device a measurement configuration that accounts for, but does not include, the CDS information.

9. The method of claim 1, wherein the CDS information sent to the wireless device comprises any one or more of:
    an indication as to which subframes are dynamic subframes;

an indication as to which subframes are not dynamic subframes; and for a case where the plurality of TDD carriers comprise a serving cell carrier for the wireless device and one or more neighboring-cell carriers, an indication as to whether the dynamic subframes are the same as between the serving-cell carrier and the one or more neighboring-cell carriers.

10. The method of claim 1, wherein at least two of the plurality of cells use respective TDD carriers having a second common carrier frequency;
the wireless device is configured to operate using carrier aggregation comprising a first serving-cell TDD carrier and a second serving-cell TDD carrier;
the respective TDD carriers having the first common carrier frequency comprise the first serving-cell TDD carrier and the respective TDD carriers having the second common carrier frequency comprise the second serving-cell TDD carrier; and
determining the CDS information for at least the first common carrier frequency comprises determining the CDS information for the second common carrier frequency.

11. The method of claim 1, wherein at least a portion of the cell-specific DS information is obtained from one or more other nodes in the network.

12. The method of claim 1, wherein the CDS information is determined based on the cell-specific DS information meeting one or more defined conditions.

13. The method of claim 12, wherein the one or more defined conditions comprise one or more of:
uplink/downlink directional changes of a defined frequency threshold or range; and
a defined signal quality threshold or range at the wireless device.

14. The method of claim 1, further comprising signaling the CDS information to another network node.

15. A network node configured for operation in a wireless communication network and for facilitating radio measurements by a wireless device with respect to one or more time-division-duplex (TDD) carriers, said radio network node comprising:
a communication interface configured for sending signaling to and receiving signaling from one or more wireless devices served by the radio network node; and
a processing circuit operatively associated with the communication interface and configured to:
obtain cell-specific dynamic subframe (DS) information, for each cell of a plurality of cells, relating to one or more TDD carriers used by each cell, wherein:
each TDD carrier comprises a plurality of subframes;
the cell-specific DS information relating to each TDD carrier indicates whether at least a portion of the plurality of subframes have a dynamically changeable uplink or downlink direction; and
at least two of the plurality of cells use respective TDD carriers having a first common carrier frequency;
determine, based on the cell-specific DS information, composite dynamic subframe (CDS) information for at least the first common carrier frequency, wherein:
the CDS information indicates that one or more subframes, comprising the TDD carriers having the first common carrier frequency, are dynamic subframes having a dynamically changeable uplink or downlink direction; and the CDS information does not associate the indicated dynamic subframes with any particular cell of the at least two of the plurality of cells; and
send the CDS information to the wireless device to facilitate one or more measurements of the wireless device at the first common carrier frequency.

16. The network node of claim 15, wherein the CDS information comprises one or more logical flags that indicate to the wireless device the presence of the dynamic subframes in the respective TDD carriers having the first common carrier frequency.

17. The network node of claim 15, wherein the CDS information comprises a CDS information message that identifies which subframes, comprising the respective TDD carriers having the first common carrier frequency, are dynamic subframes.

18. The network node of claim 15, wherein the at least two of the plurality of cells include a serving cell with respect to the wireless device and one or more neighboring cells of the serving cell.

19. The network node of claim 15, wherein the first common carrier frequency is a non-serving carrier frequency with respect to the wireless device and the at least two of the plurality of TDD carriers are neighboring-cell carriers with respect to the serving cell of the wireless device.

20. The network node of claim 15, wherein the processing circuit is configured to send the CDS information to the wireless device in response to first receiving capability information for the wireless device that indicates that the wireless device is capable of performing radio measurements to account for dynamic subframes.

21. The network node of claim 15, wherein, in response to receiving an indication that a second wireless device is not capable of accounting for CDS information when making measurements, the processing circuit is configured to send to the second wireless device a measurement configuration that accounts for, but does not include, the CDS information.

22. The network node of claim 15, wherein the network node is configured to signal the CDS information to another network node.

23. A method at a wireless device configured for operation in a wireless communication network, said method comprising:
obtaining composite dynamic subframe (CDS) information for at least a first common carrier frequency for respective TDD carriers used by at least two cells, wherein:
the CDS information is based on cell-specific dynamic subframe (DS) information, for each of a plurality of cells, that indicates whether at least a portion of a plurality of subframes comprising each of the one or more TDD carriers used by the respective cells have a dynamically changeable uplink or downlink direction;
the CDS information indicates that one or more subframes, comprising the TDD carriers having the first common carrier frequency, are dynamic subframes having a dynamically changeable uplink or downlink direction; and
the CDS information does not associate the indicated dynamic subframes with any particular cell of the at least two cells;
performing radio measurements on at least the first common carrier frequency, according to the CDS information.

24. The method of claim 23, wherein the CDS information comprises one or more logical flags indicating the presence of the dynamic subframes in the respective TDD carriers having the first common carrier frequency.

25. The method of claim 23, wherein the CDS information identifies which subframes, comprising the respective TDD carriers having the first common carrier frequency, are dynamic subframes.

26. The method of claim 23, wherein the at least two cells include a serving cell with respect to the wireless device and one or more neighboring cells of the serving cell.

27. The method of claim 23, wherein the first common carrier frequency is a non-serving carrier frequency with respect to the wireless device and the at least two cells are neighbor cells with respect to serving cell of the wireless device.

28. The method of claim 23, wherein the plurality of TDD carriers comprise a serving-cell carrier and one or more neighboring-cell carriers, and wherein the CDS information comprises an indication that the serving-cell and neighboring-cell carriers have the same dynamic subframes.

29. The method of claim 23, wherein obtaining the CDS information comprises receiving the CDS information from a network node in the network.

30. The method of claim 23, wherein obtaining the CDS information comprises determining the CDS information at the wireless device, based on cell-specific DS information derived from measurements made on the one or more TDD carriers used by the respective cells.

31. The method of claim 23, further comprising sending the CDS information or information derived therefrom, to one or more other nodes in the network.

32. The method of claim 23, wherein performing the radio measurements on at least the first common carrier frequency, according to the CDS information, comprises at least one of: avoiding making one or more radio measurements, for the respective TDD carriers at the first common carrier frequency, at times corresponding to the indicated dynamic subframes; extending measurement intervals; and increasing a number of measurements made on the respective TDD carriers at the first common carrier frequency to account for the indicated dynamic subframes.

33. The method of claim 23, further comprising sending capability information to the network indicating that the wireless device is capable of adapting its measurement configuration to account for dynamic subframes, and wherein obtaining the CDS information comprises receiving the CDS information from the network responsive to sending the capability information.

34. The method of claim 23, wherein:
the obtained CDS information comprises further CDS information for a second common carrier frequency for further respective TDD carriers used by at least two cells;
the wireless device is configured to operate using carrier aggregation comprising a first serving-cell TDD carrier having the first common carrier frequency and a second serving-cell TDD carrier having the second common carrier frequency;
performing the radio measurements comprises adapting a measurement configuration for the first serving-cell TDD carrier according to the CDS information for the first common carrier frequency, and adapting a measurement configuration for the second serving-cell TDD carrier according to the CDS information for the second common carrier frequency.

35. A wireless device configured for operation in a wireless communication network, said wireless device comprising:
a transceiver configured to send signals to and receive signals from the network;
a processing circuit that is operatively associated with the transceiver and configured to:
obtain composite dynamic subframe (CDS) information for at least a first common carrier frequency for respective TDD carriers used by at least two cells, wherein:
the CDS information is based on cell-specific dynamic subframe (DS) information, for each of a plurality of cells, that indicates whether at least a portion of a plurality of subframes comprising each of the one or more TDD carriers used by the respective cells have a dynamically changeable uplink or downlink direction;
the CDS information indicates that one or more subframes, comprising the TDD carriers having the first common carrier frequency, are dynamic subframes having a dynamically changeable uplink or downlink direction; and
the CDS information does not associate the indicated dynamic subframes with any particular cell of the at least two cells;
perform radio measurements on at least the first common carrier frequency, according to the CDS information.

36. The wireless device of claim 35, wherein the processing circuit is configured to send the CDS information or information derived therefrom, to one or more other nodes in the network.

* * * * *